United States Patent
Kubo et al.

(10) Patent No.: US 12,269,407 B2
(45) Date of Patent: Apr. 8, 2025

(54) INTERIOR COMPONENT FOR A VEHICLE

(71) Applicant: TS TECH CO., LTD., Asaka (JP)

(72) Inventors: Naoki Kubo, Tochigi (JP); Yuta Ogiwara, Tochigi (JP); Kento Kobayashi, Tochigi (JP); Atsushi Yasukawa, Tochigi (JP); Koji Shimada, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 18/043,482

(22) PCT Filed: Aug. 31, 2021

(86) PCT No.: PCT/JP2021/031826
§ 371 (c)(1),
(2) Date: Feb. 28, 2023

(87) PCT Pub. No.: WO2022/050245
PCT Pub. Date: Mar. 10, 2022

(65) Prior Publication Data
US 2024/0025365 A1    Jan. 25, 2024

(30) Foreign Application Priority Data
Sep. 1, 2020    (JP) ................................ 2020-147051

(51) Int. Cl.
*B60R 21/04*    (2006.01)
*B60R 13/02*    (2006.01)
(52) U.S. Cl.
CPC ...... *B60R 21/0428* (2013.01); *B60R 13/0243* (2013.01)
(58) Field of Classification Search
CPC ............ B60R 2021/0414; B60R 21/04; B60R 13/0243; B60R 21/0428; B60R 19/42; B60R 2021/0006
See application file for complete search history.

(56) References Cited

U.S. PATENT DOCUMENTS

| 3,808,743 A * | 5/1974 | Renner .................... B60J 5/045 |
| | | 49/374 |
| 6,681,907 B2 * | 1/2004 | Le ........................... B60R 21/04 |
| | | 293/133 |

(Continued)

FOREIGN PATENT DOCUMENTS

| DE | 102008021158 A1 * | 10/2009 | ......... B60R 21/0428 |
| DE | 102014207752 A1 * | 10/2015 | ............ B60J 5/0451 |

(Continued)

OTHER PUBLICATIONS

DE 102014207752 A1 machine translation from espacenet.com (Year: 2024).*

(Continued)

*Primary Examiner* — Paul N Dickson
*Assistant Examiner* — Maxwell L Meshaka
(74) *Attorney, Agent, or Firm* — Dority & Manning, P.A.

(57) ABSTRACT

There is provided an interior component for a vehicle including an impact absorbing member that is lightweight and compact while improving energy absorption efficiency in the event of a side collision. A side door component includes a door panel; a door trim attached to the door panel; and a protector disposed between the door panel and the door trim and attached to one of the door panel and the door trim. The protector has a bottom surface on which fixing portions attached to the one of the door panel and the door trim are formed, and a facing surface facing the other of the door panel and the door trim, and is attached to the one of the door panel and the door trim in a cantilever manner.

16 Claims, 23 Drawing Sheets

(56) References Cited

U.S. PATENT DOCUMENTS

| | | | | |
|---|---|---|---|---|
| 8,033,592 B2 * | 10/2011 | Hsu | .................. | B60R 21/0428 |
| | | | | 49/502 |
| 8,632,117 B1 * | 1/2014 | Sanchez Cruz | ..... | B60R 13/0243 |
| | | | | 296/153 |
| 9,500,250 B2 * | 11/2016 | Tamada | .................. | F16F 7/121 |
| 9,517,742 B2 * | 12/2016 | Guiard | .................... | F16F 7/12 |
| 2002/0185795 A1 * | 12/2002 | Le | .......................... | F16F 7/121 |
| | | | | 267/80 |
| 2007/0207292 A1 * | 9/2007 | Cowelchuk | ......... | B29C 45/1671 |
| | | | | 428/174 |
| 2010/0052360 A1 * | 3/2010 | Hsu | .................... | B60R 21/0428 |
| | | | | 296/146.5 |
| 2011/0204608 A1 | 8/2011 | Sun et al. | | |
| 2014/0028073 A1 * | 1/2014 | Sanchez Cruz | ..... | B60R 13/0243 |
| | | | | 297/411.21 |
| 2015/0115585 A1 | 4/2015 | Smith et al. | | |
| 2015/0291117 A1 * | 10/2015 | Guiard | .................. | B60J 5/0412 |
| | | | | 296/187.05 |
| 2015/0337917 A1 * | 11/2015 | Tamada | .................. | F16F 7/121 |
| | | | | 188/371 |
| 2019/0039547 A1 | 2/2019 | Yamamoto et al. | | |
| 2022/0063538 A1 * | 3/2022 | Faruque | .................. | G01G 19/52 |
| 2023/0365090 A1 * | 11/2023 | Inagaki | ............... | B60R 13/0243 |
| 2024/0025365 A1 * | 1/2024 | Kubo | ...................... | B60R 21/04 |

FOREIGN PATENT DOCUMENTS

| | | | | |
|---|---|---|---|---|
| DE | 102019119388 A1 * | 1/2021 | | |
| FR | 2975354 A1 * | 11/2012 | ......... | B60R 13/0206 |
| JP | 2010-163024 | 7/2010 | | |
| JP | 2015-030422 A | 2/2015 | | |

OTHER PUBLICATIONS

JP 2010163024 A machine translation from espacenet.com (Year: 2024).*

International Search Report (with English translation) for application No. PCT/JP2021/031826 mailed on Nov. 2, 2021, 4 pages.

* cited by examiner

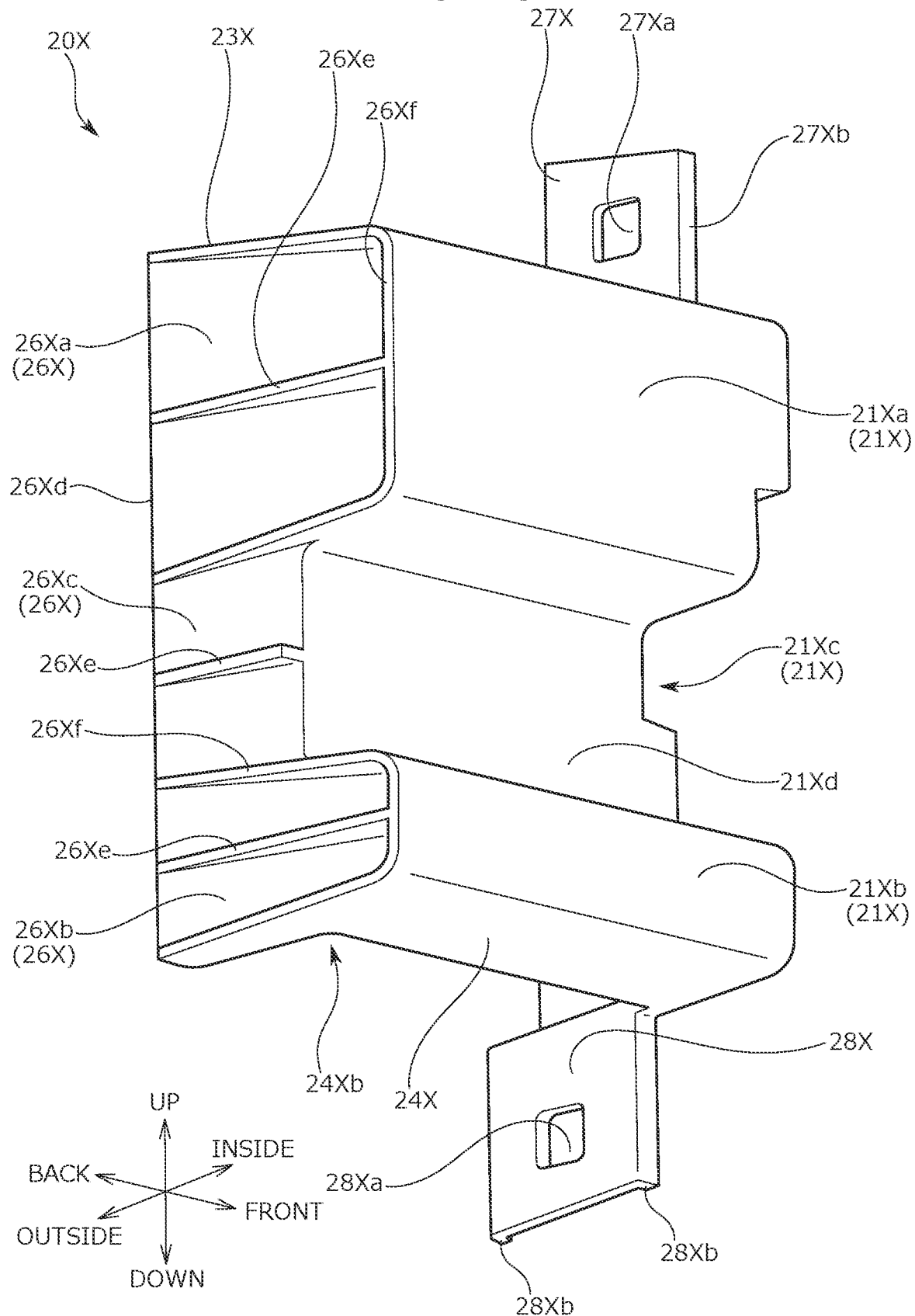

INTERIOR COMPONENT FOR A VEHICLE

CROSS REFERENCE TO RELATED APPLICATIONS

This application is the U.S. National Stage entry of International Application No. PCT/JP2021/031826, filed on Aug. 31, 2021, which, in turn, claims priority to Japanese Patent Application No. 2020-147051, filed on Sep. 1, 2020, both of which are hereby incorporated herein by reference in their entireties for all purposes.

TECHNICAL FIELD

The present invention relates to an interior component for a vehicle, particularly to an interior component for a vehicle including an impact absorbing member.

BACKGROUND ART

As a side door used in a vehicle, there is known a side door including a protector (impact absorbing member) made of a synthetic resin for absorbing an impact in the event of a side collision. For example, Patent Literature 1 discloses a technique which is related to a side door component (interior component for a vehicle) including an impact absorbing member having a box shape and attached to one of a door panel and a door trim, and in which a groove extending in a vehicle front to back direction is formed in a facing surface of impact absorbing member, which faces the other of the door panel and the door trim.

CITATION LIST

Patent Literature

PATENT LITERATURE 1: JP 6540529 B2

SUMMARY OF INVENTION

Technical Problem

However, a protector having a box shape included in the side door component of Patent Literature 1 has a structure for holding rigidity, and an improvement in energy absorption performance has been desirable.

Therefore, the present invention is conceived in view of the foregoing problem, and an object of the present invention is to provide an interior component for a vehicle including an impact absorbing member that is lightweight and compact while improving energy absorption efficiency in the event of a side collision.

Solution to Problem

The foregoing problem is solved by an interior component for a vehicle according to the present invention, the component including: a door panel; a door trim attached to the door panel; and an impact absorbing member disposed between the door panel and the door trim and attached to one of the door panel and the door trim. The impact absorbing member has a bottom surface on which a fixing portion attached to the one of the door panel and the door trim is formed, and a facing surface facing the other of the door panel and the door trim, and the impact absorbing member is attached to the one of the door panel and the door trim in a cantilever manner.

In the interior component for a vehicle according to the present invention configured as described above, since the impact absorbing member is attached to the one of the door panel and the door trim in a cantilever manner, it is possible to moderate the initial rise of a load stress applied to the facing surface in the event of a side collision.

In addition, it is preferable that the impact absorbing member has a front surface disposed in a front, a rear surface disposed in a rear, an upper surface disposed on an upper side, and a lower surface disposed on a lower side, between the facing surface and the bottom surface, and the impact absorbing member has an inverted L shape in a top view and in a bottom view.

According to this configuration, since the impact absorbing member has an inverted L shape in a top view and in a bottom view, it is possible to reduce the weight of the impact absorbing member while appropriately absorbing an impact applied to the impact absorbing member in the event of a side collision.

In addition, it is preferable that the facing surface of the impact absorbing member is inclined in a direction toward the bottom surface while extending toward the front or the rear.

According to this configuration, since the facing surface that is a contact surface for impact is inclined, one end portion of the facing surface can be first brought into contact with the door panel or the door trim.

In addition, it is preferable that the fixing portion of the impact absorbing member is formed to protrude in a direction from the bottom surface toward the facing surface.

According to this configuration, since the fixing portion is formed to protrude, rigidity of the fixing portion is improved, and the fixing of the impact absorbing member to the door panel or the door trim is stabilized.

In addition, it is preferable that the facing surface, the front surface, and the bottom surface form a C-shaped cross section.

According to this configuration, since a C-shaped cross section is formed by the facing surface, the front surface, and the bottom surface, it is possible to absorb an impact by appropriately receiving a load.

In addition, it is preferable that a first recessed portion extending in a vehicle width direction is formed in the front surface or the rear surface of the impact absorbing member, and the fixing portion is provided only on one of a front side and a rear side with respect to a bottom portion of the first recessed portion in a vehicle front to back direction.

According to this configuration, since the fixing portion is provided only on one side with respect to the first recessed portion, the fixing range of the impact absorbing member is widened, and a load can be stably received.

In addition, it is preferable that a plurality of reinforcement ribs are provided on the rear surface of the impact absorbing member, and the bottom portion of the first recessed portion is correspondingly disposed between the plurality of reinforcement ribs.

According to this configuration, since the plurality of reinforcement ribs are separately disposed by the first recessed portion, necessary and sufficient rigidity in a compact space can be obtained.

In addition, it is preferable that the bottom surface of the impact absorbing member includes a second recessed portion recessed in a direction toward the facing surface, and a portion of the first recessed portion is disposed at a same height position as a height position of the second recessed portion in a vehicle up to down direction.

According to this configuration, since the second recessed portion of the bottom surface and the first recessed portion of the front surface or the rear surface at least partially intersect each other, rigidity of a connecting portion between the bottom surface that is a fixing surface and the front surface or the rear surface is improved.

In addition, it is preferable that the fixing portion is provided behind the rear surface and behind the bottom portion of the first recessed portion in the vehicle front to back direction.

According to this configuration, since the fixing portion is disposed at a position avoiding the rear surface and the bottom portion of the first recessed portion, namely, upright walls, it is possible to efficiently improve rigidity of the fixing portion while suppressing an increase in the weight of the impact absorbing member.

In addition, it is preferable that the interior component for a vehicle further includes another member attached to the one of the door panel and the door trim, and another member fixing portion that attaches the another member to the one of the door panel and the door trim is disposed in a vicinity of the first recessed portion of the impact absorbing member.

According to this configuration, since the another member fixing portion such as a door pocket or the like is disposed in the vicinity of the first recessed portion of the impact absorbing member, a load input to the impact absorbing member can be prevented from being directly transmitted to the another component while improving rigidity of the fixing portion of the impact absorbing member.

Advantageous Effects of Invention

In the interior component for a vehicle according to the present invention, since the impact absorbing member is attached to one of the door panel and the door trim in a cantilever manner, it is possible to moderate the initial rise of a load stress applied to the facing surface in the event of a side collision.

In addition, in the interior component for a vehicle according to the present invention, since the impact absorbing member has an inverted L shape in a top view and in a bottom view, it is possible to reduce the weight of the impact absorbing member while appropriately absorbing an impact applied to the impact absorbing member in the event of a side collision.

In addition, in the interior component for a vehicle according to the present invention, since the facing surface that is a contact surface for impact is inclined, the one end portion of the facing surface can be first brought into contact with the door panel or the door trim.

In addition, in the interior component for a vehicle according to the present invention, since the fixing portion is formed to protrude, rigidity of the fixing portion is improved, and the fixing of the impact absorbing member to the door panel or the door trim is stabilized.

In addition, in the interior component for a vehicle according to the present invention, since a C-shaped cross section is formed by the facing surface, the front surface, and the bottom surface, it is possible to absorb an impact by appropriately receiving a load.

In addition, in the interior component for a vehicle according to the present invention, since the fixing portion is provided only on one side with respect to the first recessed portion, the fixing range of the impact absorbing member is widened, and a load can be stably received.

In addition, in the interior component for a vehicle according to the present invention, since the plurality of reinforcement ribs are separately disposed by the first recessed portion, necessary and sufficient rigidity in a compact space can be obtained.

In addition, in the interior component for a vehicle according to the present invention, since the second recessed portion of the bottom surface and the first recessed portion of the front surface or the rear surface at least partially intersect each other, rigidity of a connecting portion between the bottom surface that is a fixing surface and the front surface or the rear surface is improved.

In addition, in the interior component for a vehicle according to the present invention, since the fixing portion is disposed at a position avoiding the rear surface and the bottom portion of the first recessed portion, namely, upright walls, it is possible to efficiently improve rigidity of the fixing portion while suppressing an increase in the weight of the impact absorbing member.

In addition, in the interior component for a vehicle according to the present invention, since the another member fixing portion such as the door pocket or the like is disposed in the vicinity of the first recessed portion of the impact absorbing member, a load input to the impact absorbing member can be prevented from being directly transmitted to the another component while improving rigidity of the fixing portion of the impact absorbing member.

BRIEF DESCRIPTION OF DRAWINGS

FIG. 19 is a perspective view of the protector according to the modification example when viewed from the outside front.

DESCRIPTION OF EMBODIMENTS

Hereinafter, a configuration example of a side door component as an interior component for a vehicle according to one embodiment (present embodiment) of the present invention will be described. Incidentally, the embodiment to be described below is intended to facilitate understanding of the present invention, and does not limit the present invention. In addition, the present invention can be changed or improved without departing from the concept thereof, and it goes without saying that the present invention includes equivalents thereof.

In addition, in the following description of the specification, a "front to back direction (vehicle front to back direction)" is a direction corresponding to a front to back direction of a vehicle and coinciding with a traveling direction of the vehicle. In addition, an "inside to outside direction (vehicle inside to outside direction)" is a direction coinciding with a width direction of the vehicle (vehicle width direction). An "up to down direction (vehicle up to down direction)" means a height direction of the vehicle (vehicle height direction), and coincides with an up to down direction of the vehicle when viewed from the front.

<Side Door Component 1>

Figure 1:
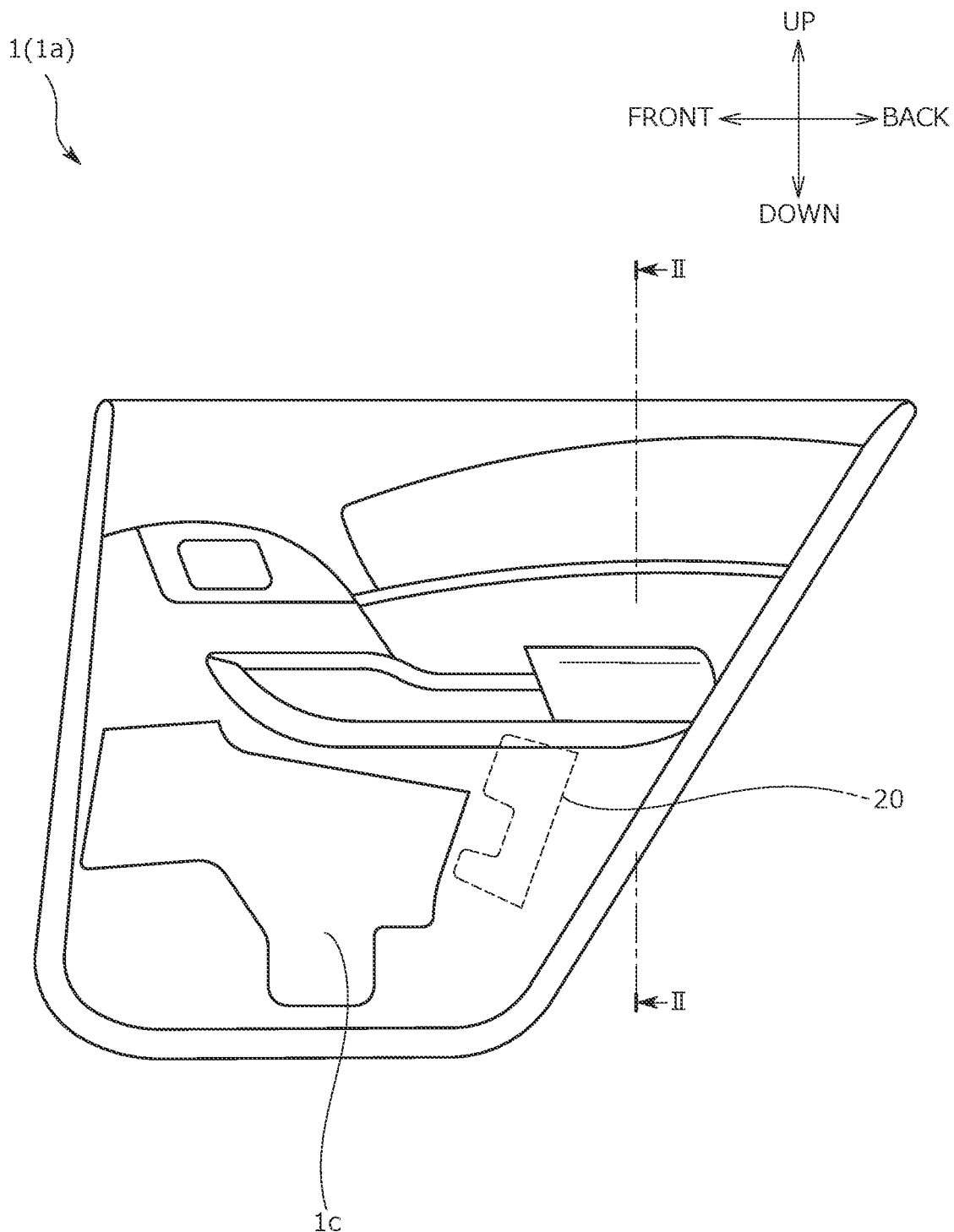
FIG. 1 is a front view of a side door component according to one embodiment of the present invention.
Figure 2:
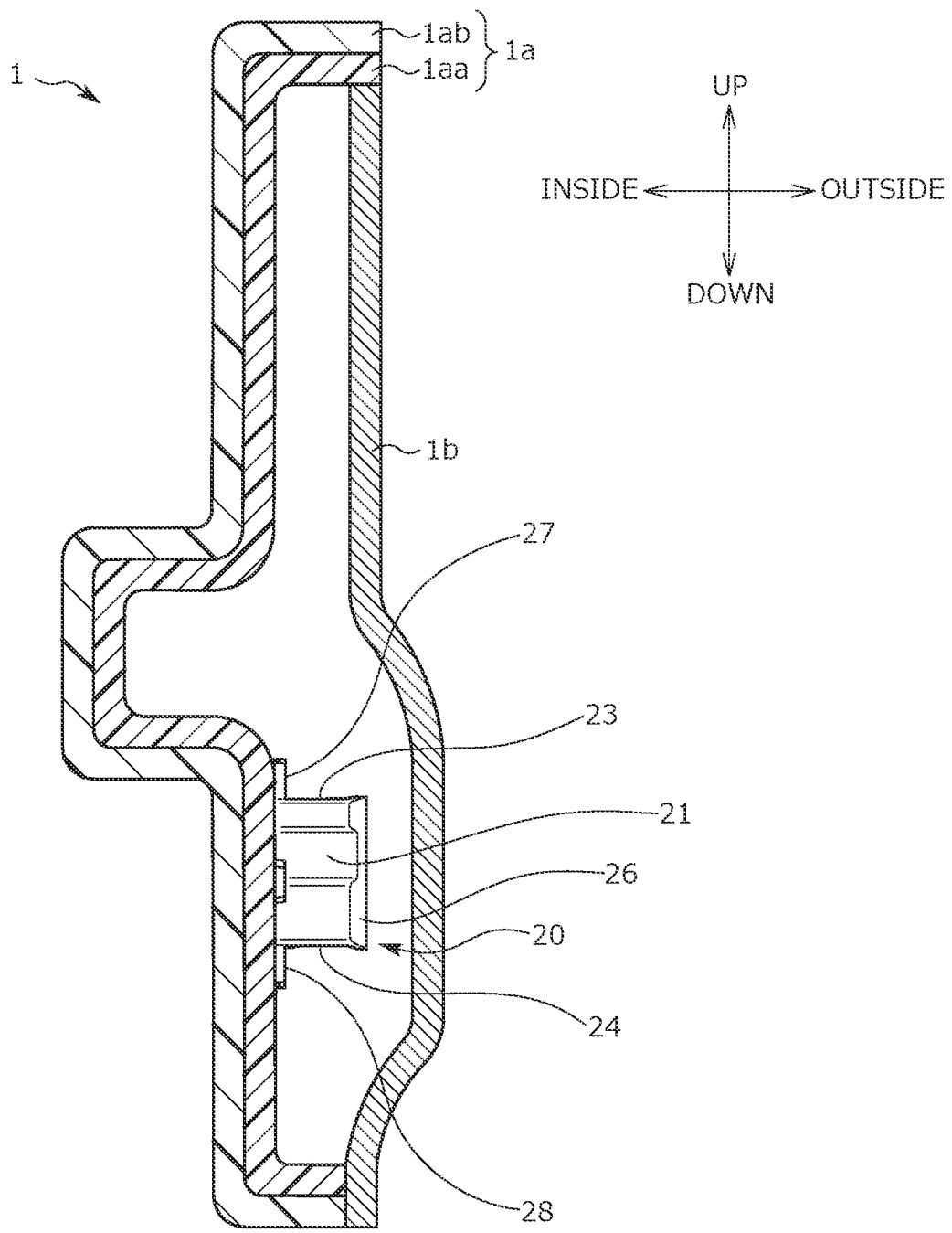
FIG. 2 is a schematic view showing a cross section of a door trim and a door panel forming the side door component taken along line II-II of FIG. 1.

A side door component 1 including a protector 20 according to the present embodiment will be described with reference to FIGS. 1 to 16E. The side door component 1 includes a door trim 1a located inside in the vehicle width direction, and a door panel 1b that is located outside the door trim 1a in the vehicle width direction, and that is attached to the door trim 1a in an overlapping manner. Specifically, as shown in FIG. 2, the door trim 1a is formed in a multi-layer structure including a base material resin layer 1aa and a skin resin layer 1ab that is stacked inside the base material resin layer 1aa in the width direction.

In addition, the protector 20 made of a synthetic resin such as polypropylene formed by injection molding is disposed between the door trim 1a and the door panel 1b.

The protector 20 as an impact absorbing member is a member that increases rigidity of the side door component 1 and that absorbs an impact (load) to be applied in the event of a side collision of a vehicle, and in the present embodiment, is fixed to a surface on a door panel 1b side of the base material resin layer 1aa of the door trim 1a. Incidentally, the protector 20 may be made of a synthetic resin material other than polypropylene, and may be molded by a molding method other than injection molding.

Figure 3:
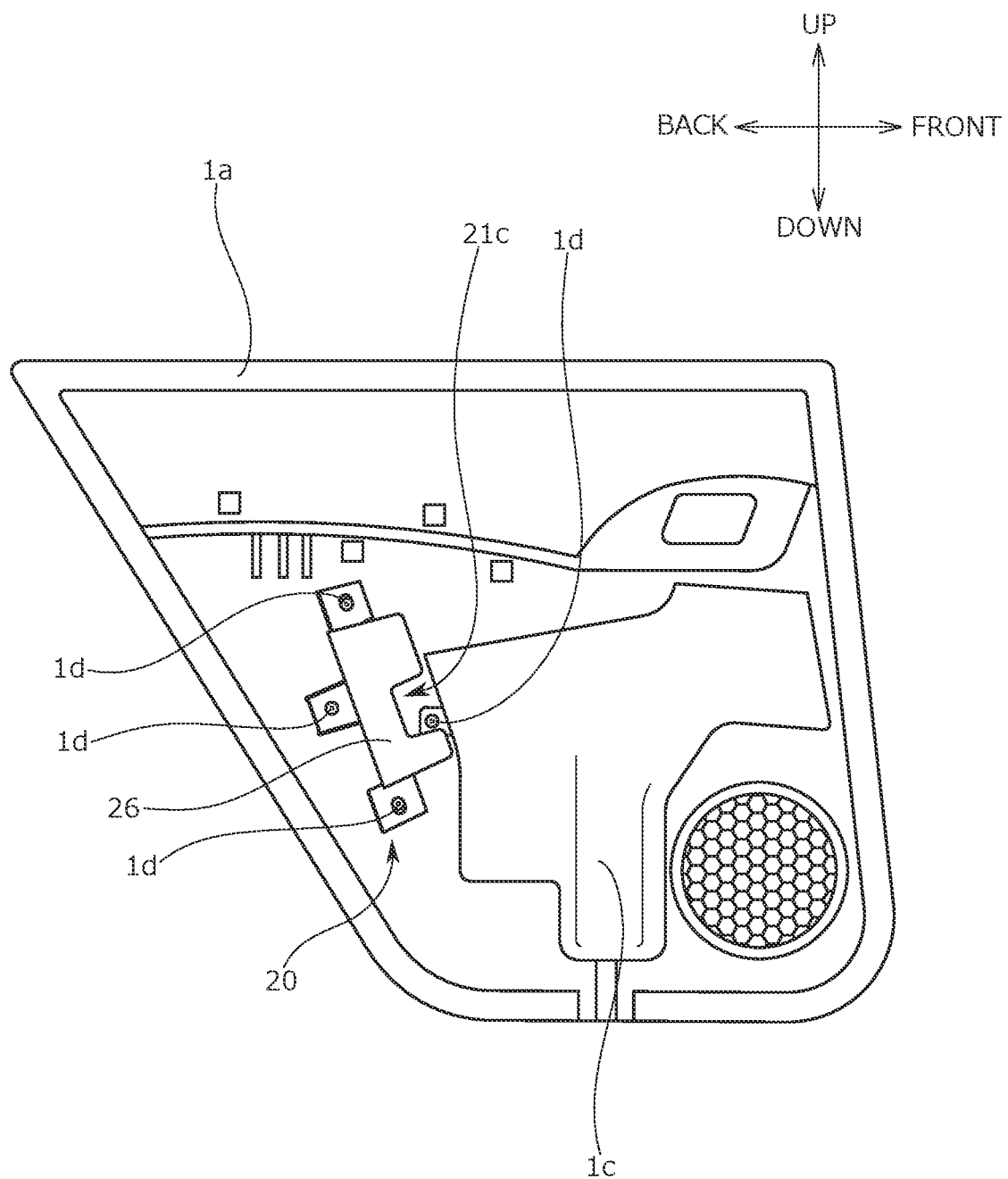
FIG. 3 is a schematic view showing an outer surface of the door trim in a vehicle width direction.
Figure 4:
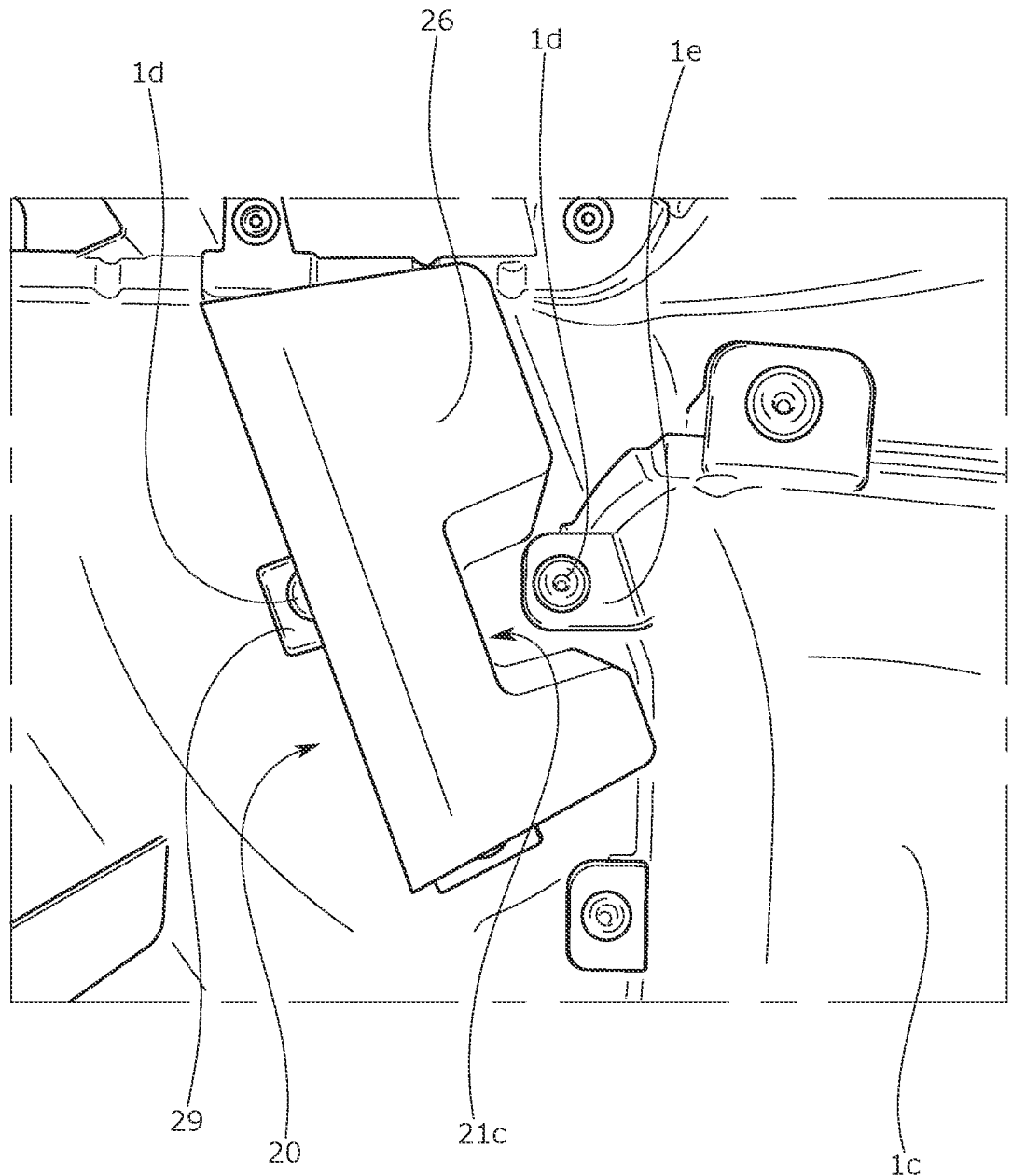
FIG. 4 is an enlarged view of a periphery of a protector.
Figure 4:
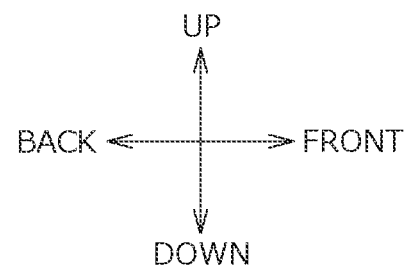

In addition, as shown in FIGS. 3 and 4, the protector 20 or a door pocket 1c is attached to the door trim 1a by a welded portion 1d formed by applying heat or ultrasonic waves. A door pocket fixing portion 1e that attaches the door pocket 1c to the door trim 1a is disposed in the vicinity of a front surface recessed portion 21c (first recessed portion) to be described later of the protector 20, more specifically, at a position surrounded by the front surface recessed portion 21c (FIG. 4). Since the protector 20 or the door pocket 1c is attached to the door trim 1a in such a manner, a load input to the protector 20 can be prevented from being directly transmitted to the door pocket 1c that is another component.

Incidentally, as long as the protector 20 or the door pocket 1c can be reliably fixed to the door trim 1a, the protector 20 or the door pocket 1c may be attached to the door trim 1a by a fastener such as a tapping screw or by caulking, instead of by the welded portion 1d through welding. In addition, the protector 20 or the door pocket 1c may be configured to be attached to the door trim 1a by a method in which a resin claw is fitted to a hole or a claw.

<Protector 20>

Next, details of each portion of the protector 20 will be described with reference to FIGS. 5 to 15. The protector 20 has a front surface 21, a rear surface 22, an upper surface 23, a lower surface 24, a bottom surface 25, a facing surface 26, an upper attachment plate 27, a lower attachment plate 28, and a middle attachment plate 29 as main components.

Figure 5:
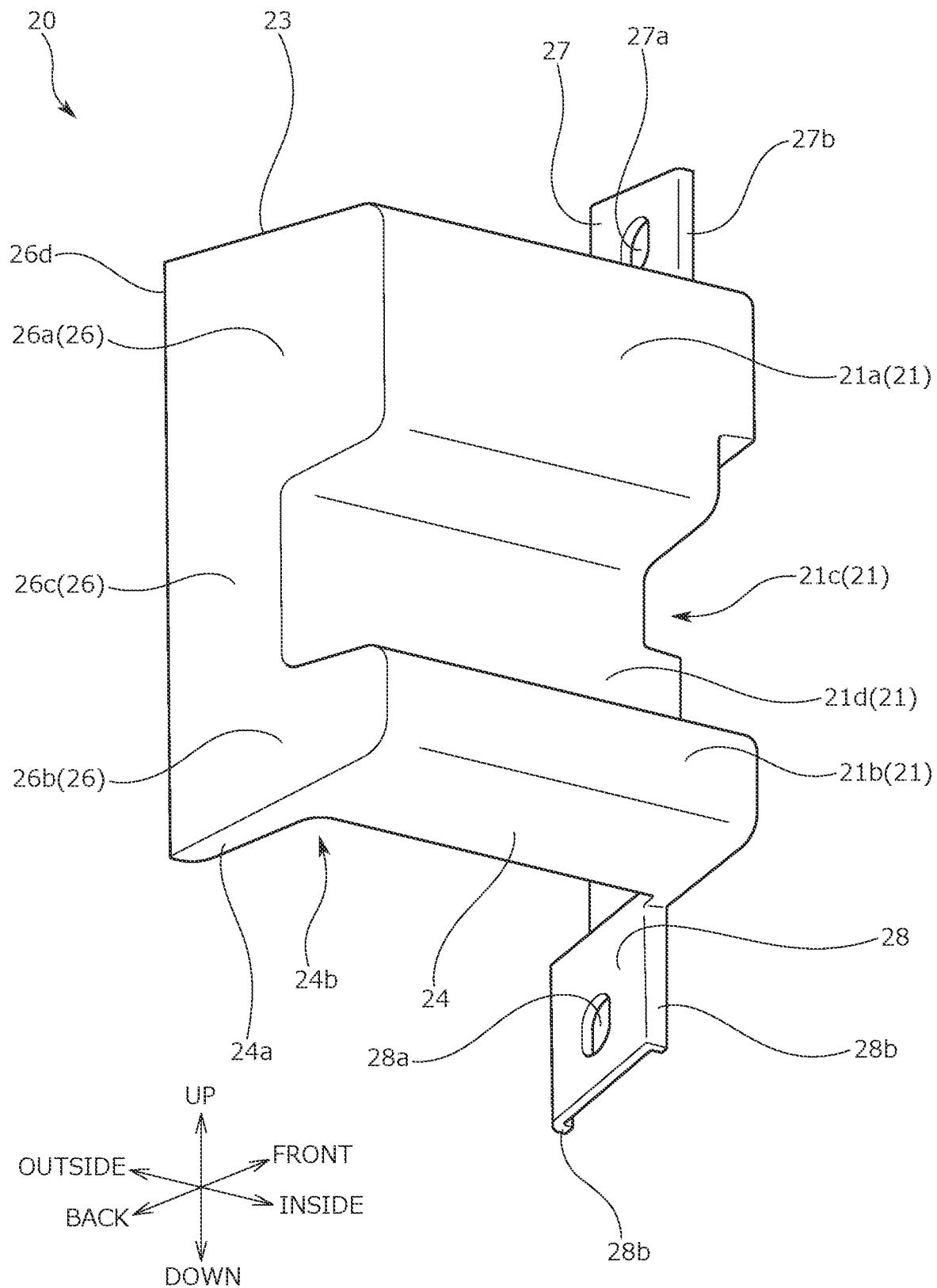
FIG. 5 is a perspective view of the protector when viewed from the outside front.
Figure 6:
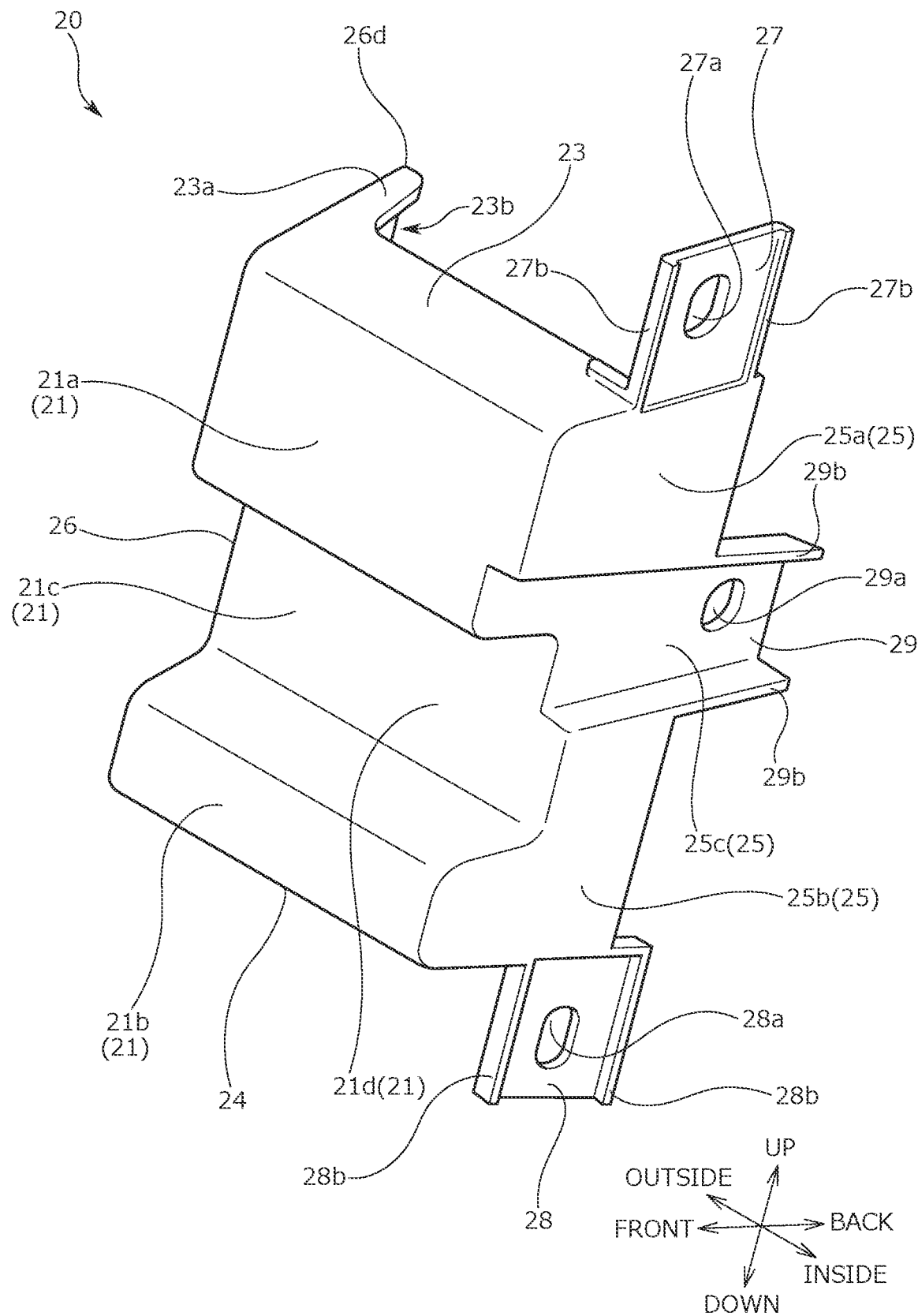
FIG. 6 is a perspective view of the protector when viewed from the inside front.

The protector 20 has the bottom surface 25 in which an upper attachment hole 27a, a lower attachment hole 28a, and a middle attachment hole 29a as fixing portions to be attached to the door trim 1a are formed, and the facing surface 26 facing the door panel 1b in the inside to outside direction, in a state where the protector 20 is attached to the door trim 1a (FIGS. 5 and 6).

In addition, the protector 20 has the front surface 21 and the rear surface 22 that are disposed in the front and in the rear in the front to back direction, respectively, and the upper surface 23 and the lower surface 24 that are disposed up and down in the up to down direction, respectively, between the facing surface 26 and the bottom surface 25 in a state where the protector 20 is attached to the door trim 1a (FIGS. 5 and 6).

In other words, the protector 20 is formed to mainly have the front surface 21 that is located in the front in the front to back direction to extend in the up to down direction and in the inside to outside direction, the rear surface 22 that is a back surface of the front surface 21, and the upper surface 23, the lower surface 24, the bottom surface 25, and the facing surface 26 extending backward from upper, lower, inner, and outer peripheral edges of the front surface 21 in the front to back direction, in a state where the protector 20 is attached to the door trim 1a.

(Front Surface 21)

Figure 7:
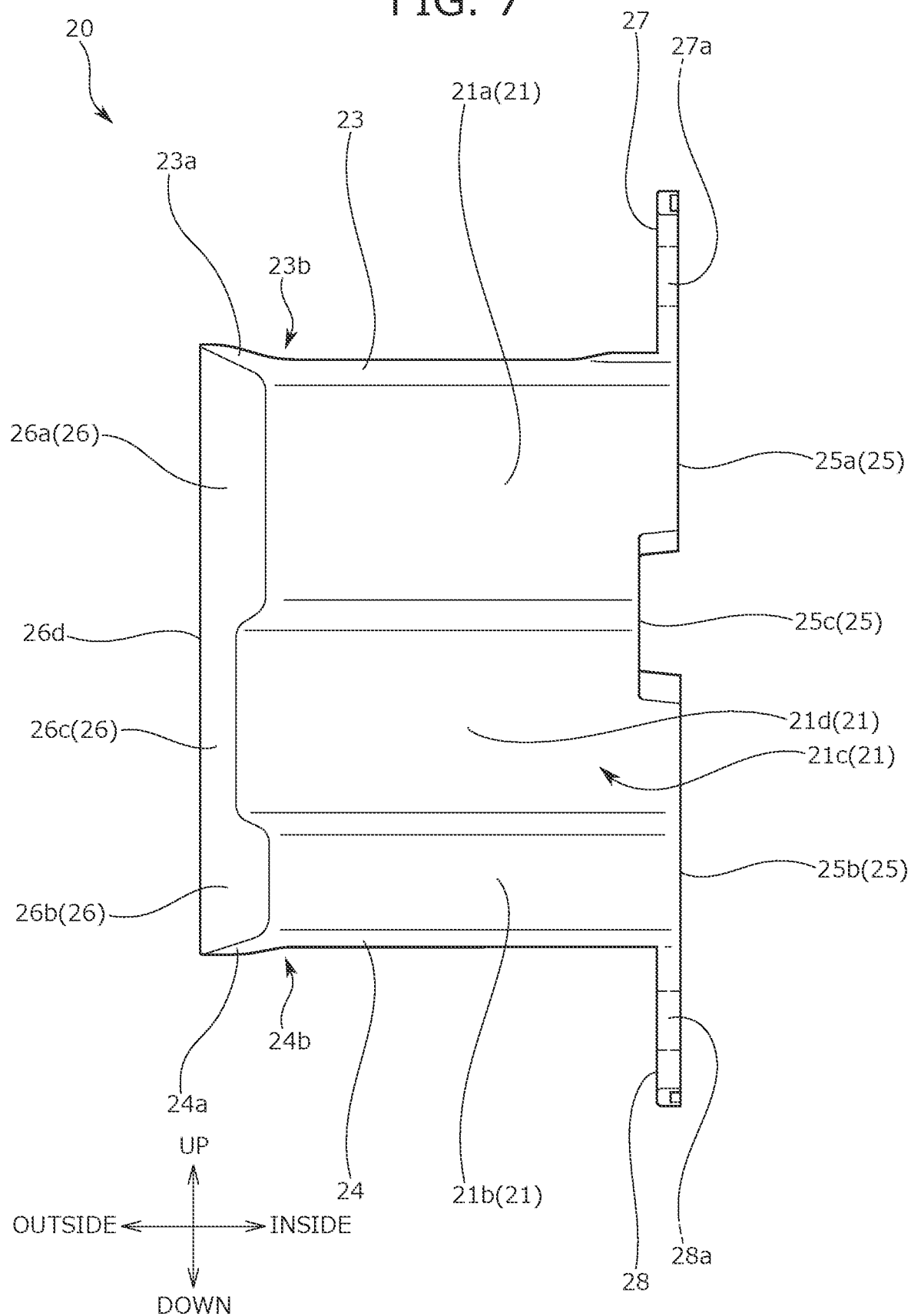
FIG. 7 is a view of the protector when viewed from the front.

The front surface 21 is a front wall that is located in the front in the front to back direction to extend in the up to down direction and in the inside to outside direction (FIG. 7). The front surface 21 is divided up and down into a front surface upper portion 21a and a front surface lower portion 21b by the front surface recessed portion 21c. The front surface recessed portion 21c includes a bottom portion 21d, and is formed to be recessed to a rear surface 22 side with respect to the front surface upper portion 21a and to the front surface lower portion 21b. In addition, the front surface recessed portion 21c is formed to extend from the bottom surface 25 to the facing surface 26 in the inside to outside direction.

(Rear Surface 22)

The rear surface 22 is a surface that is the back surface of the front surface 21, and is located on a rear side of the protector 20 in the front to back direction to extend in the up to down direction and in the inside to outside direction (FIG.

8). The rear surface 22 is divided up and down into a rear surface upper portion 22a and a rear surface lower portion 22b by a rear surface middle portion 22c.

The rear surface upper portion 22a corresponds to the front surface upper portion 21a of the front surface 21, the rear surface lower portion 22b corresponds to the front surface lower portion 21b of the front surface 21, and the rear surface middle portion 22c corresponds to the bottom portion 21d of the front surface recessed portion 21c. The rear surface upper portion 22a and the rear surface lower portion 22b are recessed forward with respect to the rear surface middle portion 22c, and a plurality of reinforcement ribs 22d1, 22d2, and 22d3 are upright formed in the recesses.

Figure 8:
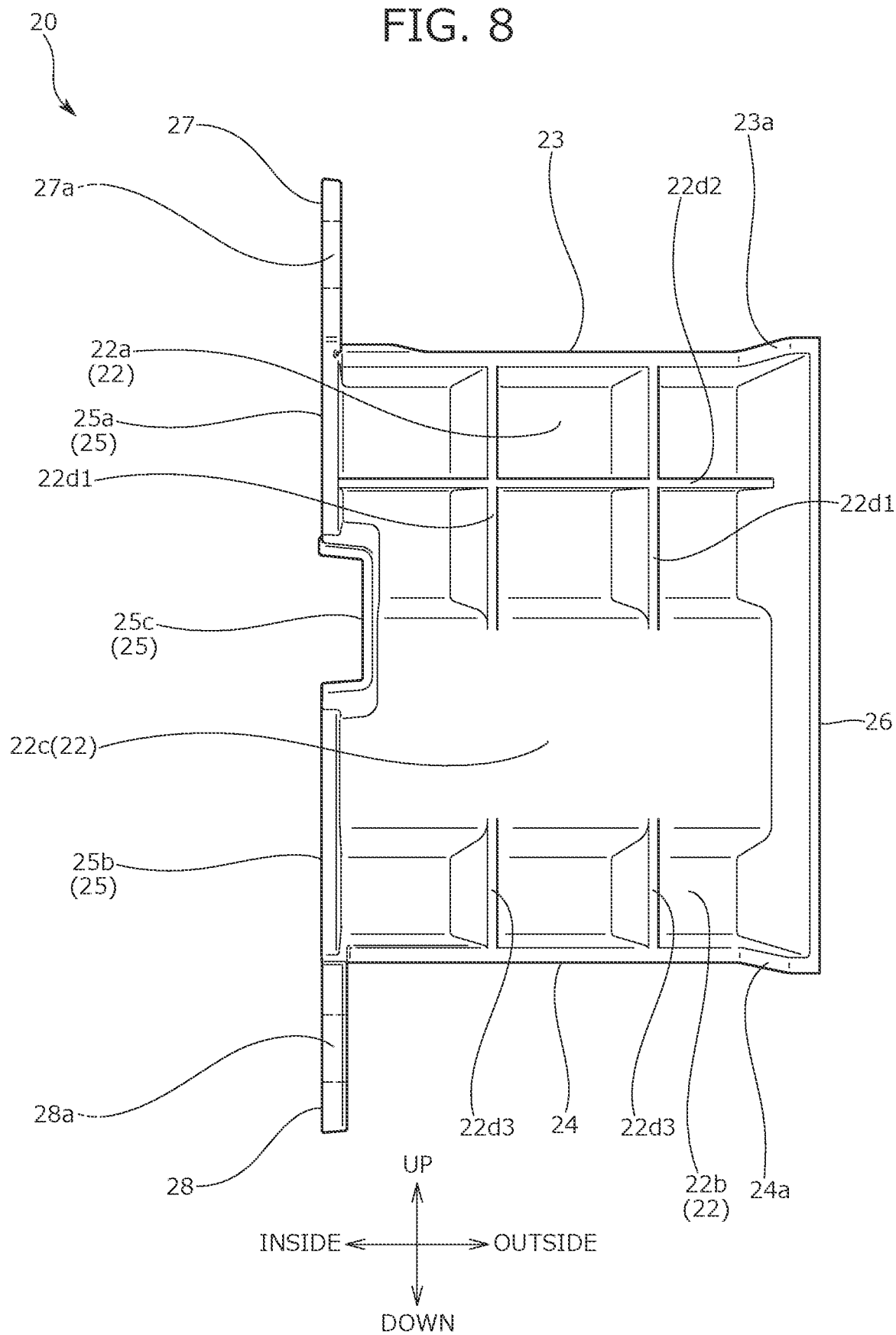
FIG. 8 is a view of the protector when viewed from the rear.

In the recess of the rear surface upper portion 22a, a total of three reinforcement ribs including two reinforcement ribs 22d1 that connect the upper surface 23 and the rear surface middle portion 22c and that extend in the up to down direction and in the front to back direction, and one reinforcement rib 22d2 that connects the bottom surface 25 and the facing surface 26 and that extends in the inside to outside direction and in the front to back direction are formed upright from the rear surface 22 (FIG. 8). In addition, in the recess of the rear surface lower portion 22b, two reinforcement ribs 22d3 that connect the lower surface 24 and the rear surface middle portion 22c and that extend in the up to down direction and in the front to back direction are formed upright from the rear surface 22 (FIG. 8). Incidentally, the number of the reinforcement ribs 22d1, 22d2, and 22d3 is not particularly limited, and a more plurality of the reinforcement ribs 22d1, 22d2, and 22d3 may be provided.

The rear surface middle portion 22c corresponding to the bottom portion 21d of the front surface recessed portion 21c is disposed between the reinforcement ribs 22d1 and 22d2 and the reinforcement ribs 22d3. Since the plurality of reinforcement ribs 22d1 and 22d2 and reinforcement ribs 22d3 are separately disposed by the rear surface middle portion 22c corresponding to the bottom portion 21d of the front surface recessed portion 21c, in other words, since the reinforcement ribs 22d1 and 22d2 and the reinforcement ribs 22d3 are separately disposed on the rear surface upper portion 22a and on the rear surface lower portion 22b, respectively, necessary and sufficient rigidity in a compact space can be obtained.

Further, since the reinforcement ribs 22d1, 22d2, and 22d3 are formed to be exposed on the rear surface 22 side that is an open side which is formed by disposing a mold thereon, the shape of the reinforcement ribs 22d1, 22d2, and 22d3 can be easily changed by changing the shape of the mold. Therefore, the rigidity can be easily adjusted by changing the shape of the reinforcement ribs 22d1, 22d2, and 22d3, for example, by changing the shape thereof into a geometric shape such as a truss shape other than a grid shape.

(Upper Surface 23)

Figure 9:
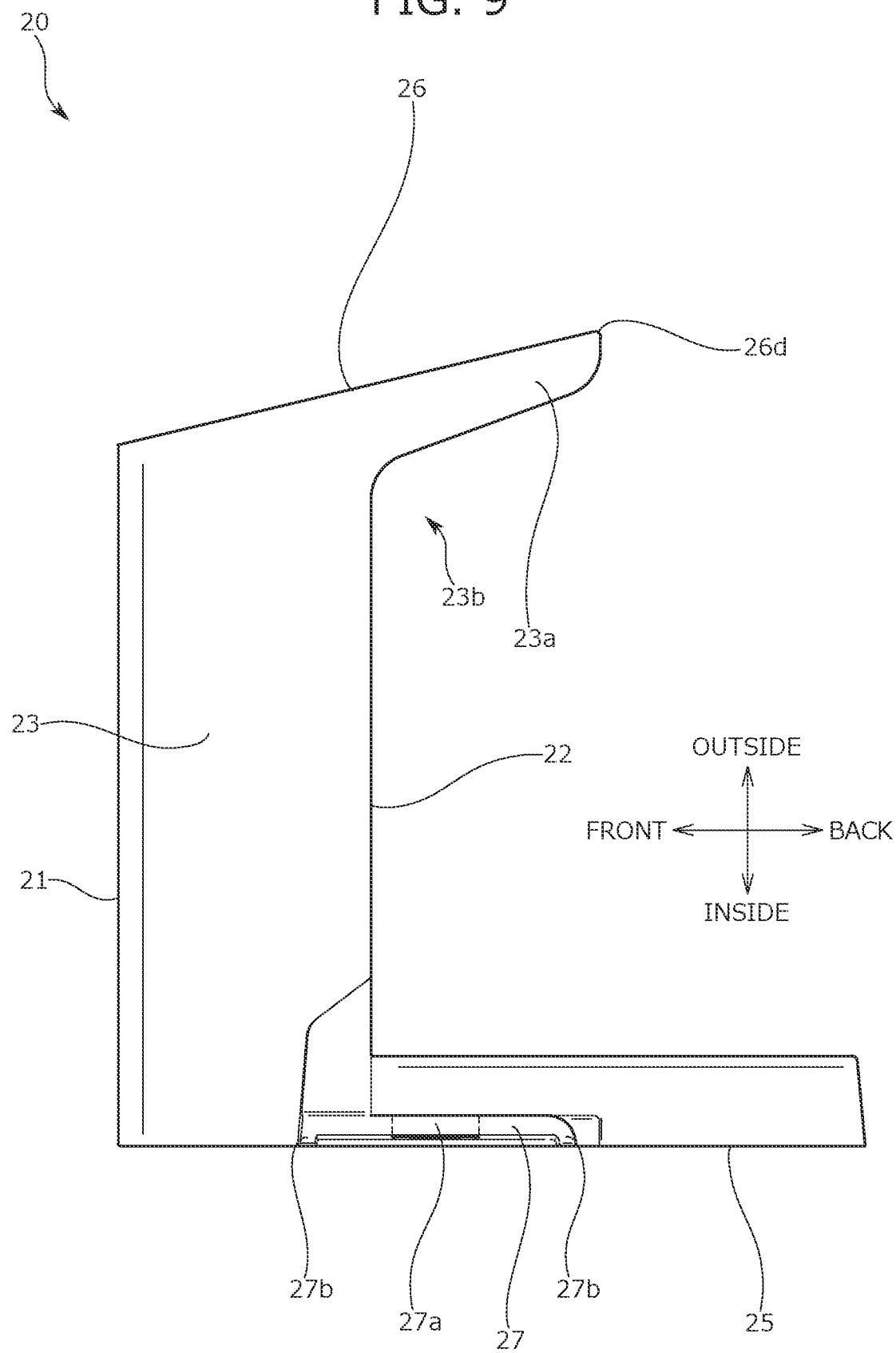
FIG. 9 is a view of the protector when viewed from above.

The upper surface 23 extends backward from upper peripheral edges of the front surface 21 and the rear surface 22, and is located on an upper side of the protector 20 in the up to down direction to extend in the front to back direction and in the inside to outside direction (FIG. 9). The upper surface 23 includes an upper surface protrusion portion 23a protruding further backward from the rear surface 22 on a facing surface 26 side (namely, the outside in the inside to outside direction). The upper surface 23 includes a cutout 23b inside the upper surface protrusion portion 23a of the protector 20, and has an inverted L shape in a top view.

(Lower Surface 24)

Figure 10:
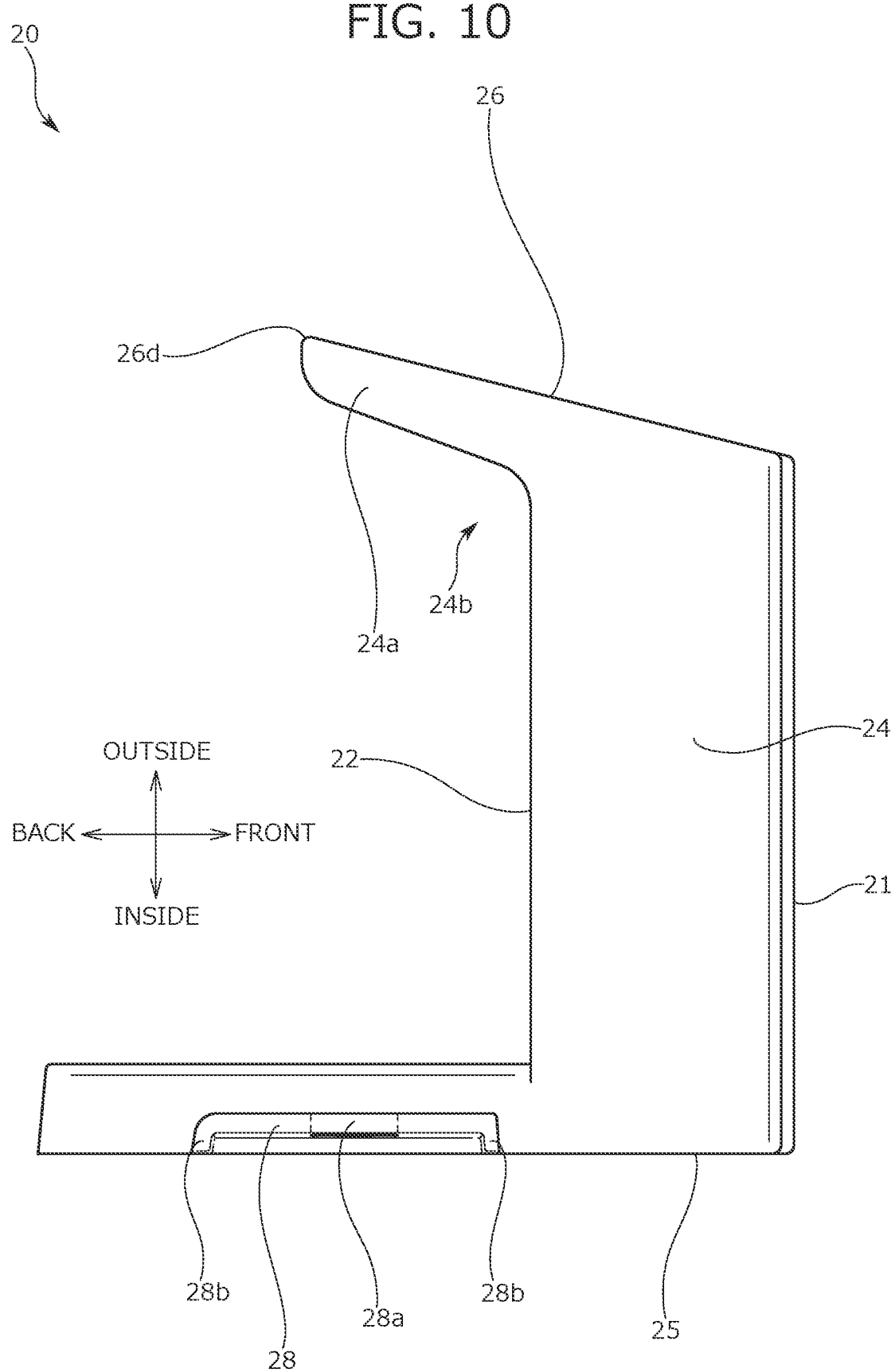
FIG. 10 is a view of the protector when viewed from below.

The lower surface 24 extends backward from lower peripheral edges of the front surface 21 and the rear surface 22, and is located on a lower side of the protector 20 in the up to down direction to extend in the front to back direction and in the inside to outside direction (FIG. 10). The lower surface 24 includes a lower surface protrusion portion 24a protruding further backward from the rear surface 22 on the facing surface 26 side (namely, the outside in the inside to outside direction). The lower surface 24 includes a cutout 24b inside the lower surface protrusion portion 24a of the protector 20, and has an inverted L shape in a bottom view.

(Bottom Surface 25)

Figure 11:
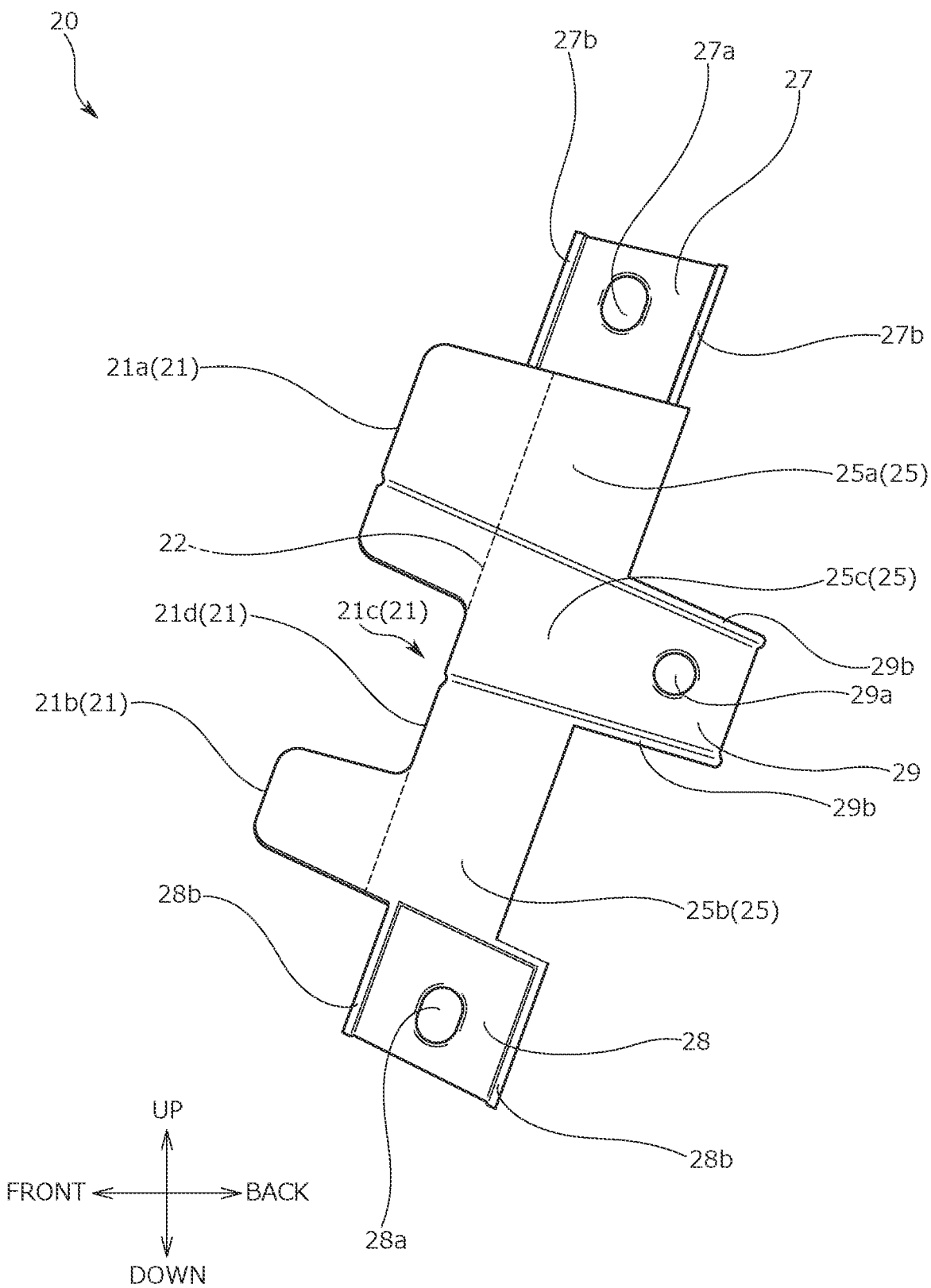
FIG. 11 is a view of the protector when viewed from the inside.

The bottom surface 25 extends backward from inner peripheral edges of the front surface 21 and the rear surface 22 in the front to back direction, and is located on an inner side of the protector 20 in the inside to outside direction to extend in the up to down direction and in the front to back direction (FIG. 11). The bottom surface 25 is divided up and down into a bottom surface upper portion 25a and a bottom surface lower portion 25b by a bottom surface recessed portion 25c. The bottom surface recessed portion 25c is formed to be recessed to a facing surface 26 side (namely, the outside in the vehicle inside to outside direction) with respect to the bottom surface upper portion 25a and to the bottom surface lower portion 25b. In addition, the bottom surface recessed portion 25c is formed to extend from the front surface 21 to the rear surface 22 in the front to back direction.

(Facing Surface 26)

Figure 12:
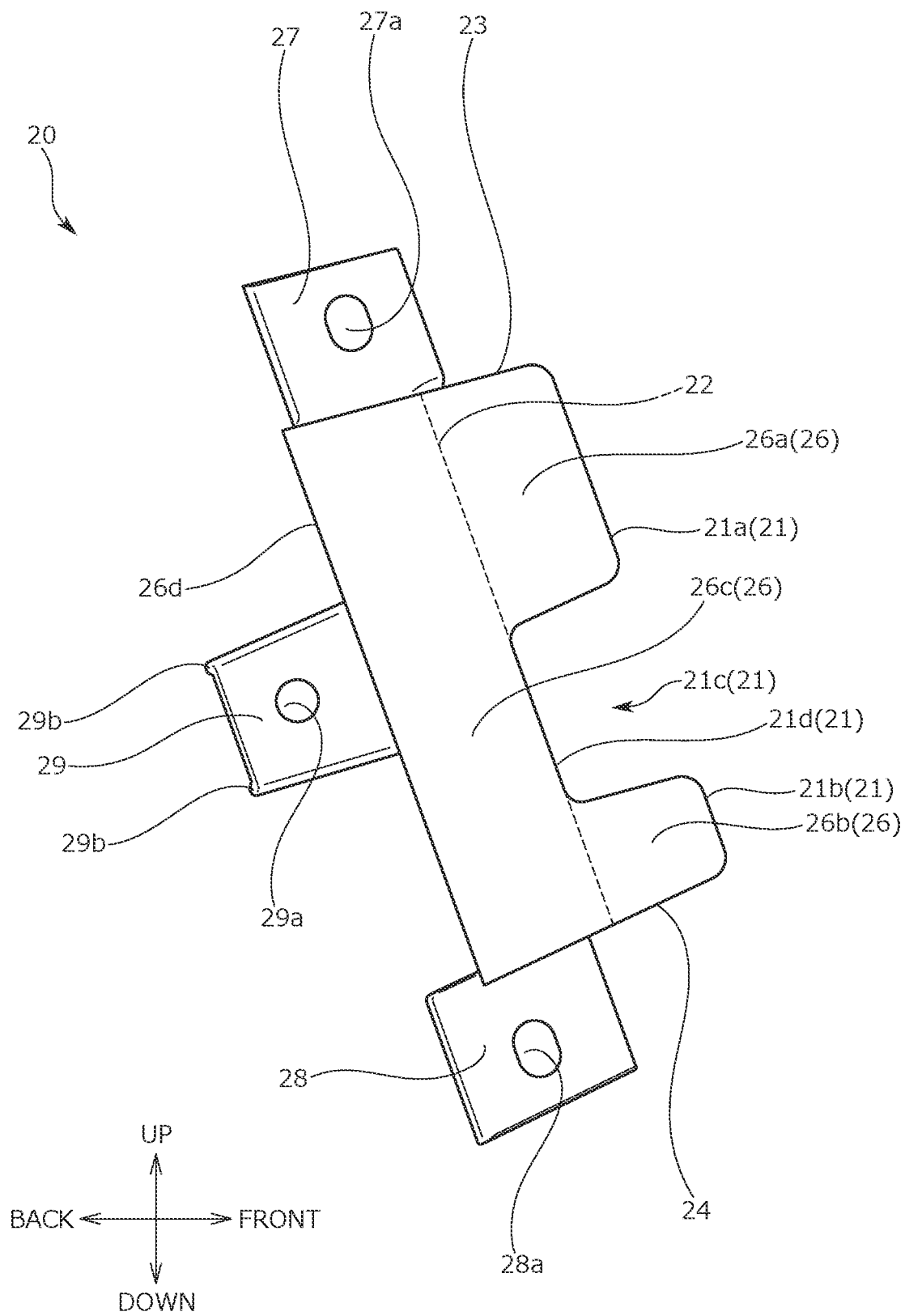
FIG. 12 is a view of the protector when viewed from the outside.

The facing surface 26 is a surface that is disposed at a position facing the door panel 1b in a state where the protector 20 is fixed to the door trim 1a. The facing surface 26 is divided up and down into a facing surface upper portion 26a and a facing surface lower portion 26b by a facing surface middle portion 26c (FIG. 12). The facing surface upper portion 26a, the facing surface lower portion 26b, and the facing surface middle portion 26c extend backward from outer peripheral edges of the front surface upper portion 21a, the front surface lower portion 21b, and the bottom portion 21d of the front surface recessed portion 21c in the front to back direction, respectively. The facing surface 26 includes a free end portion 26d at a rear end thereof.

(Upper Attachment Plate 27)

The upper attachment plate 27 is formed to continue from the bottom surface upper portion 25a of the bottom surface 25 on an upper side of the upper surface 23 (in other words, the upper side of the protector 20 in the up to down direction) (FIGS. 12 to 15). Specifically, the upper attachment plate 27 extends upward from an inner peripheral edge of the upper surface 23, and is formed to extend in the up to down direction and in the front to back direction.

The upper attachment plate 27 has the upper attachment hole 27a (fixing portion) penetrating therethrough in a plate thickness direction (inside to outside direction), and is fixed to the door trim 1a by the welded portion 1d formed by applying welding to the upper attachment hole 27a. The upper attachment plate 27 includes ribs 27b on respective front and rear sides thereof in the front to back direction, the ribs 27b extending in the up to down direction, and is slightly recessed outward (direction toward the facing surface 26) with respect to the bottom surface upper portion 25a.

(Lower Attachment Plate 28)

The lower attachment plate 28 is formed to continue from the bottom surface lower portion 25b of the bottom surface 25 on a lower side of the lower surface 24 (in other words, a lower side of the protector 20 in the up to down direction) (FIGS. 12 to 15). Specifically, the lower attachment plate 28 extends downward from an inner peripheral edge of the lower surface 24, and is formed to extend in the up to down direction and in the front to back direction.

The lower attachment plate 28 has the lower attachment hole 28a (fixing portion) penetrating therethrough in a plate thickness direction (inside to outside direction), and is fixed to the door trim 1a by the welded portion 1d formed by applying welding to the lower attachment hole 28a. The lower attachment plate 28 includes ribs 28b on respective front and rear sides thereof in the front to back direction, the ribs 28b extending in the up to down direction, and is slightly recessed outward (direction toward the facing surface 26) with respect to the bottom surface upper portion 25a.

(Middle Attachment Plate 29)

The middle attachment plate 29 is formed to continue from the bottom surface recessed portion 25c of the bottom surface 25 on a rear side of the bottom surface recessed portion 25c (in other words, the rear side of the protector 20 in the front to back direction) (FIGS. 12 to 15). Specifically, the middle attachment plate 29 extends backward from a rear peripheral edge of the bottom surface 25, and is formed to extend in the up to down direction and in the front to back direction.

The middle attachment plate 29 has the middle attachment hole 29a (fixing portion) penetrating therethrough in a plate thickness direction (inside to outside direction), and is fixed to the door trim 1a by the welded portion 1d formed by applying welding to the middle attachment hole 29a. The middle attachment plate 29 includes ribs 29b on respective upper and lower sides thereof in the up to down direction, the ribs 29b extending in the front to back direction, and is slightly recessed outward (direction toward the facing surface 26) with respect to the bottom surface 25, so that the bottom surface recessed portion 25c is formed.

<Regarding Features of Protector 20>

Figure 13:
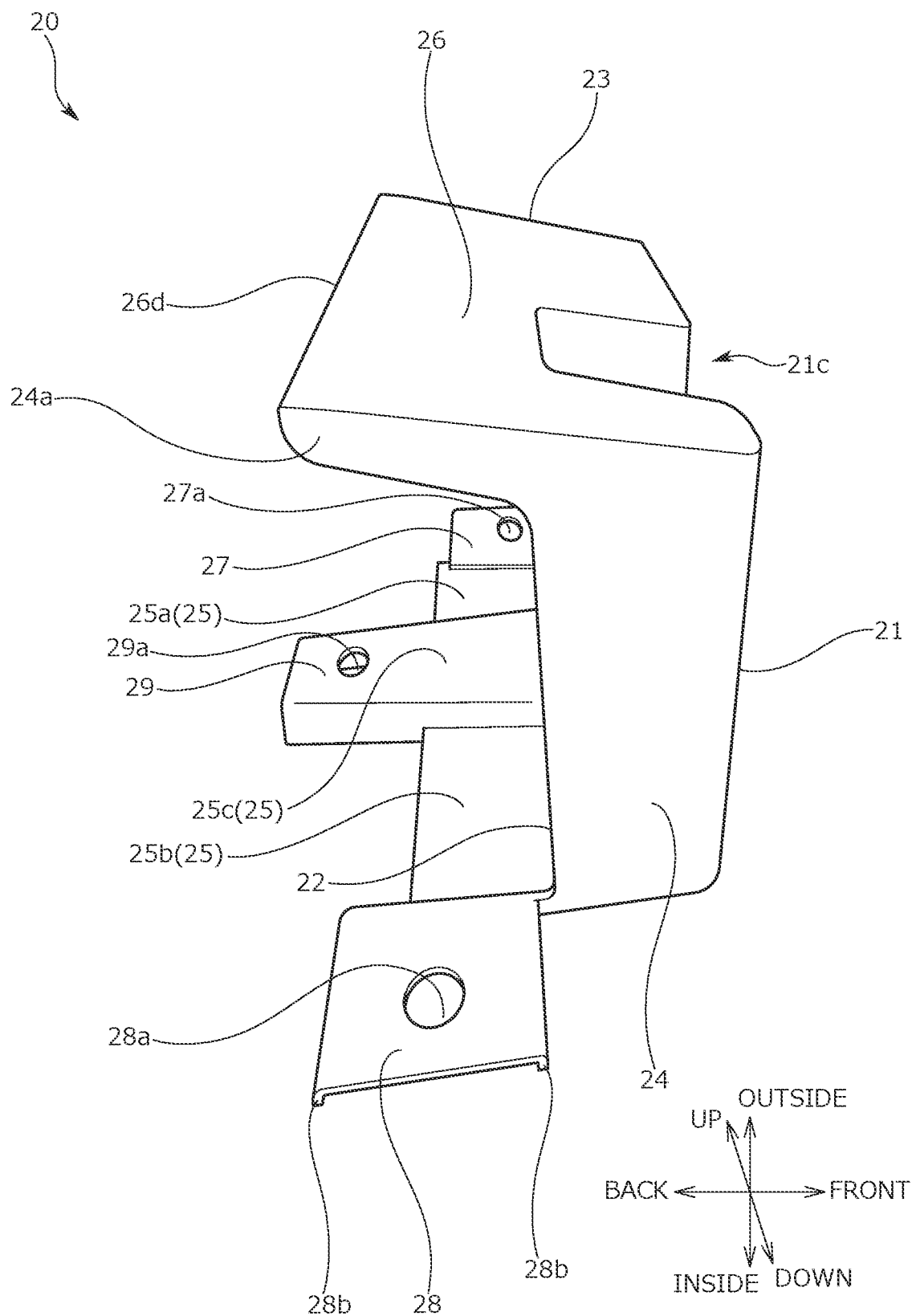
FIG. 13 is a perspective view of the protector when viewed from the lower front side.
Figure 14:
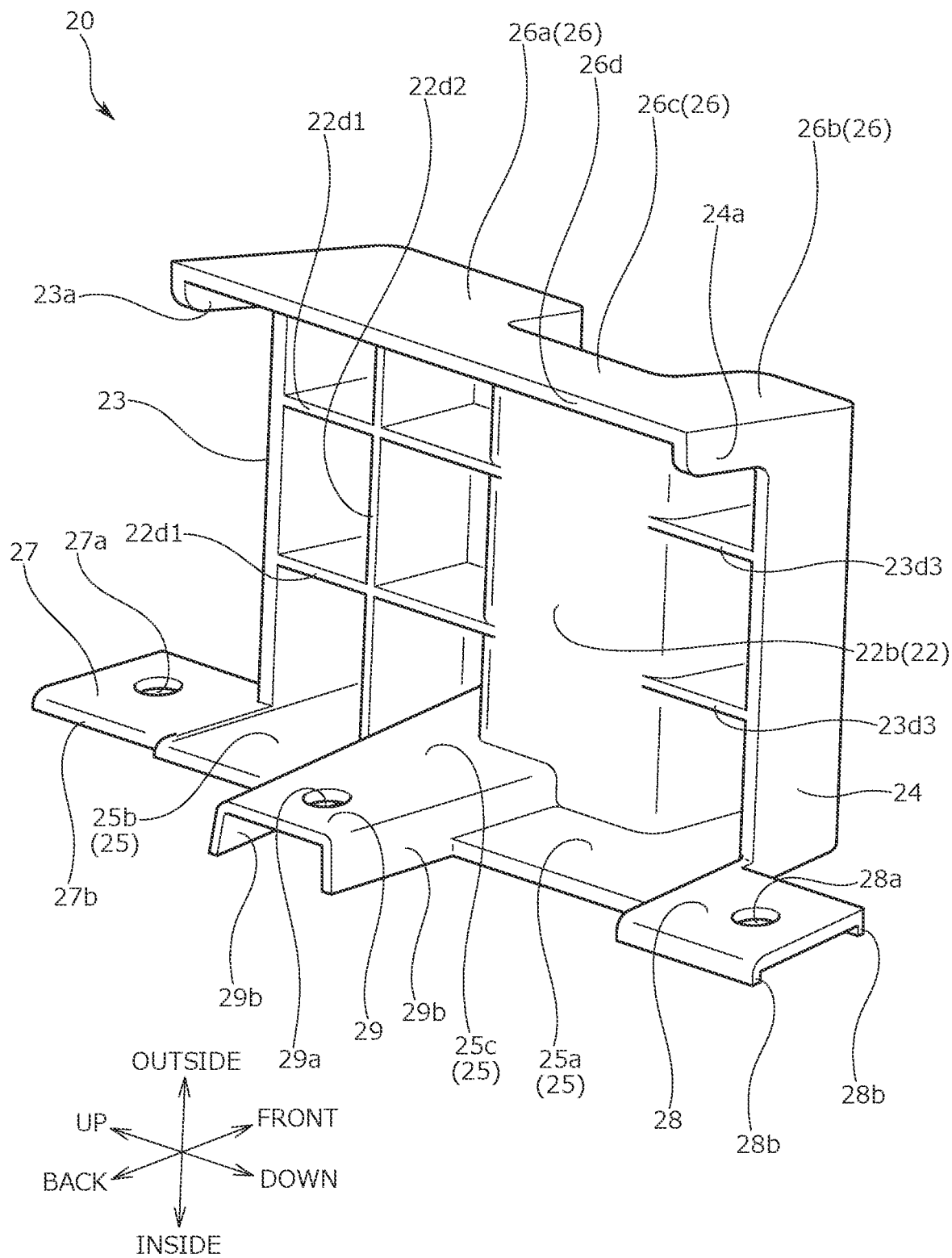
FIG. 14 is a perspective view of the protector when viewed from the lower rear side.
Figure 15:
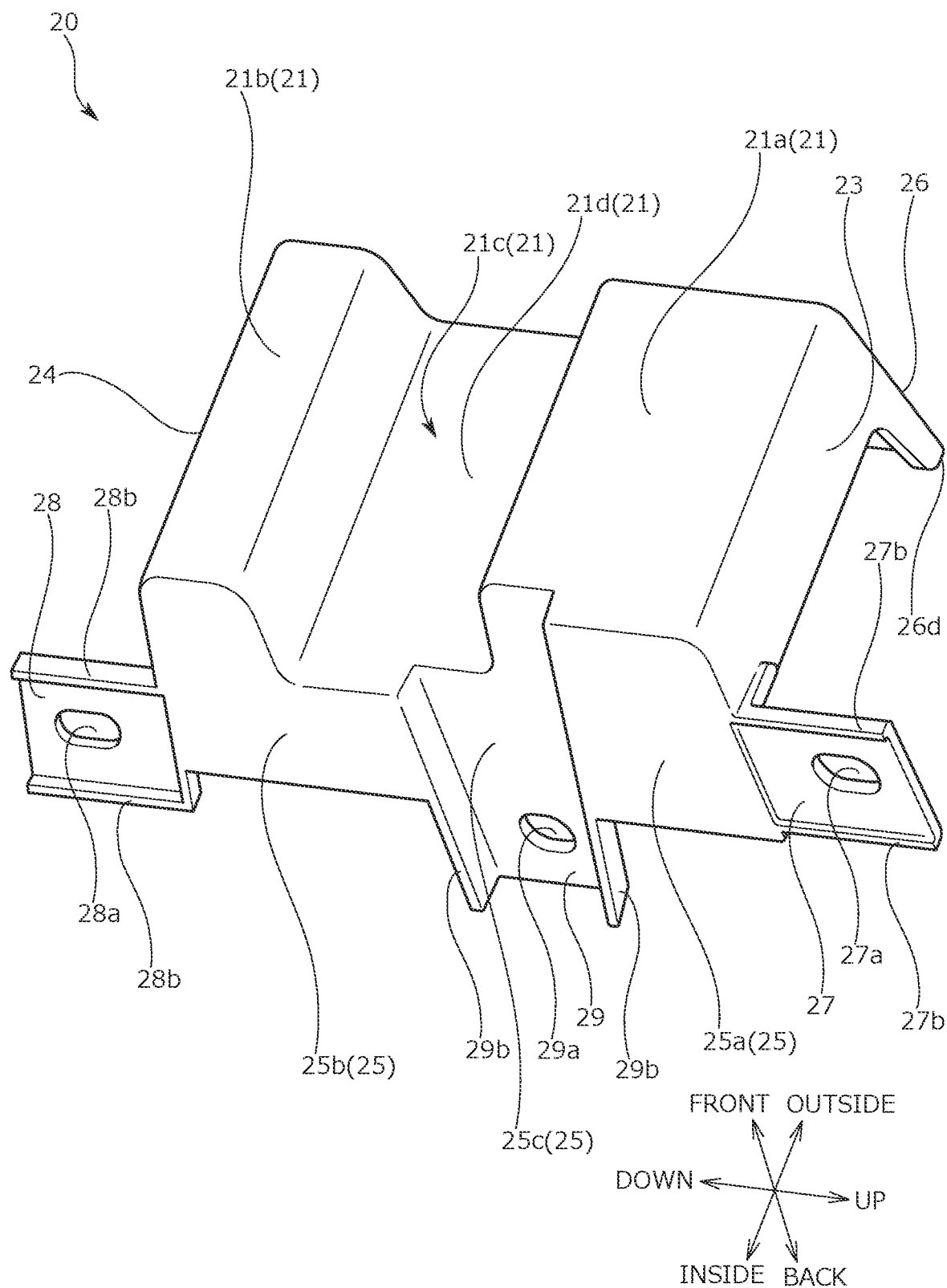
FIG. 15 is a perspective view of the protector when viewed from the bottom surface side.

The protector 20 is attached to the door trim 1a in a cantilever manner by the welded portions 1d at three locations formed by applying welding to each of the upper attachment hole 27a, the lower attachment hole 28a, and the middle attachment hole 29a (FIG. 13).

Here, "cantilever" means that one end is fixed and the other end is a free end. In addition, a "cantilever state" means a state where one end is fixed and the other end has a free end. In addition, a "cantilever structure" means a structure (cantilever) in which one end is fixed and the other end has a free end.

In the protector 20, one end side (bottom surface 25 side) in the inside to outside direction is fixed to the door trim 1a, and the other end side (facing surface 26 side) is the free end portion 26d. In such a manner, when the protector 20 is attached to the door trim 1a in a cantilever manner, it is possible to moderate the initial rise of a load stress applied to the facing surface 26 in the event of a side collision.

Figure 16A:
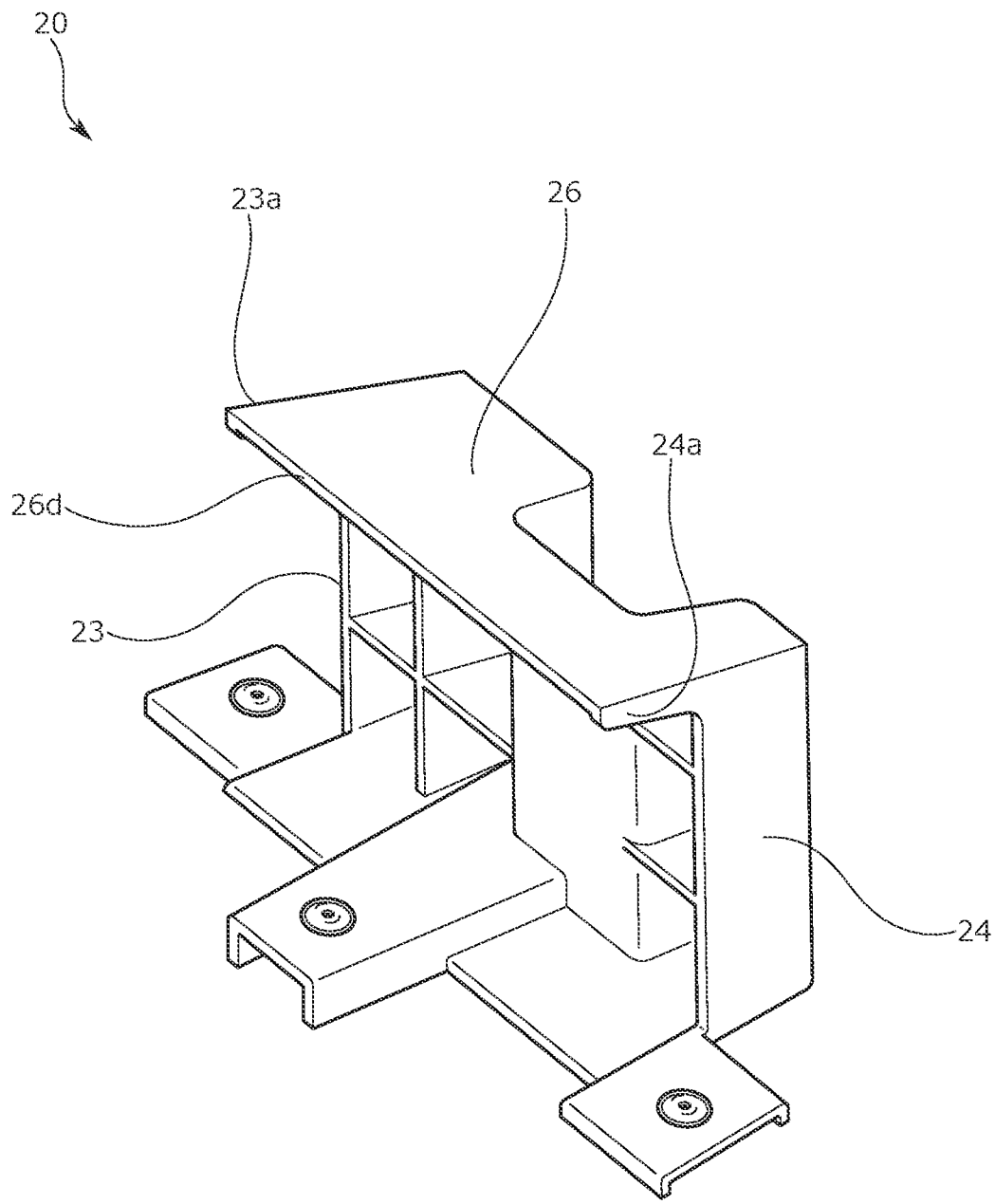
FIG. 16A is a schematic view for describing the process of deformation of the protector in the event of a side collision (part 1).
Figure 16B:
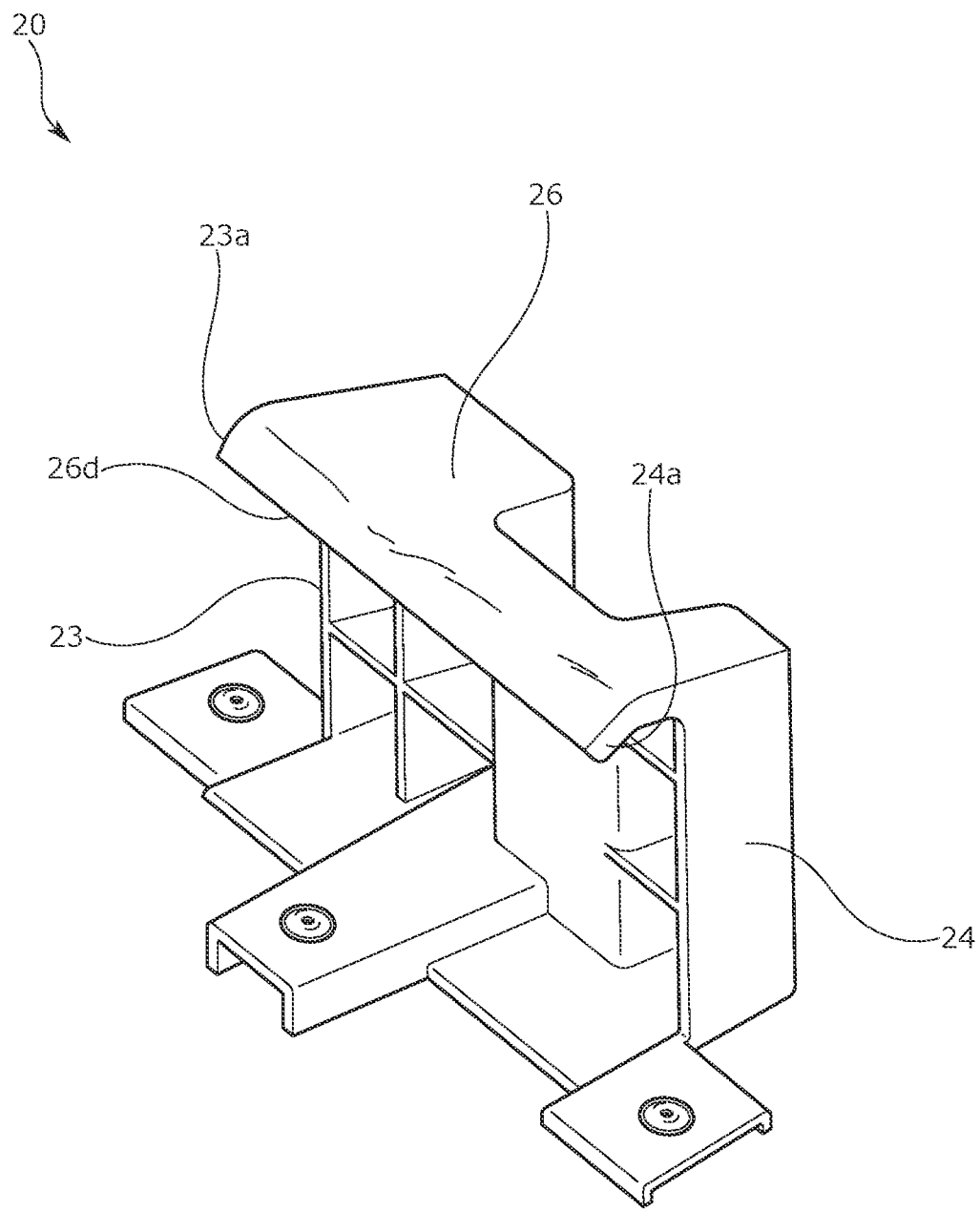
FIG. 16B is a schematic view for describing the process of deformation of the protector in the event of a side collision (part 2).
Figure 16B:
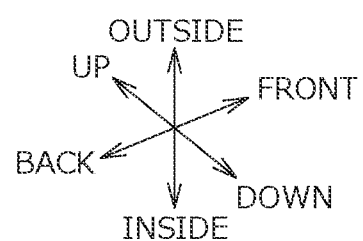
Figure 16C:
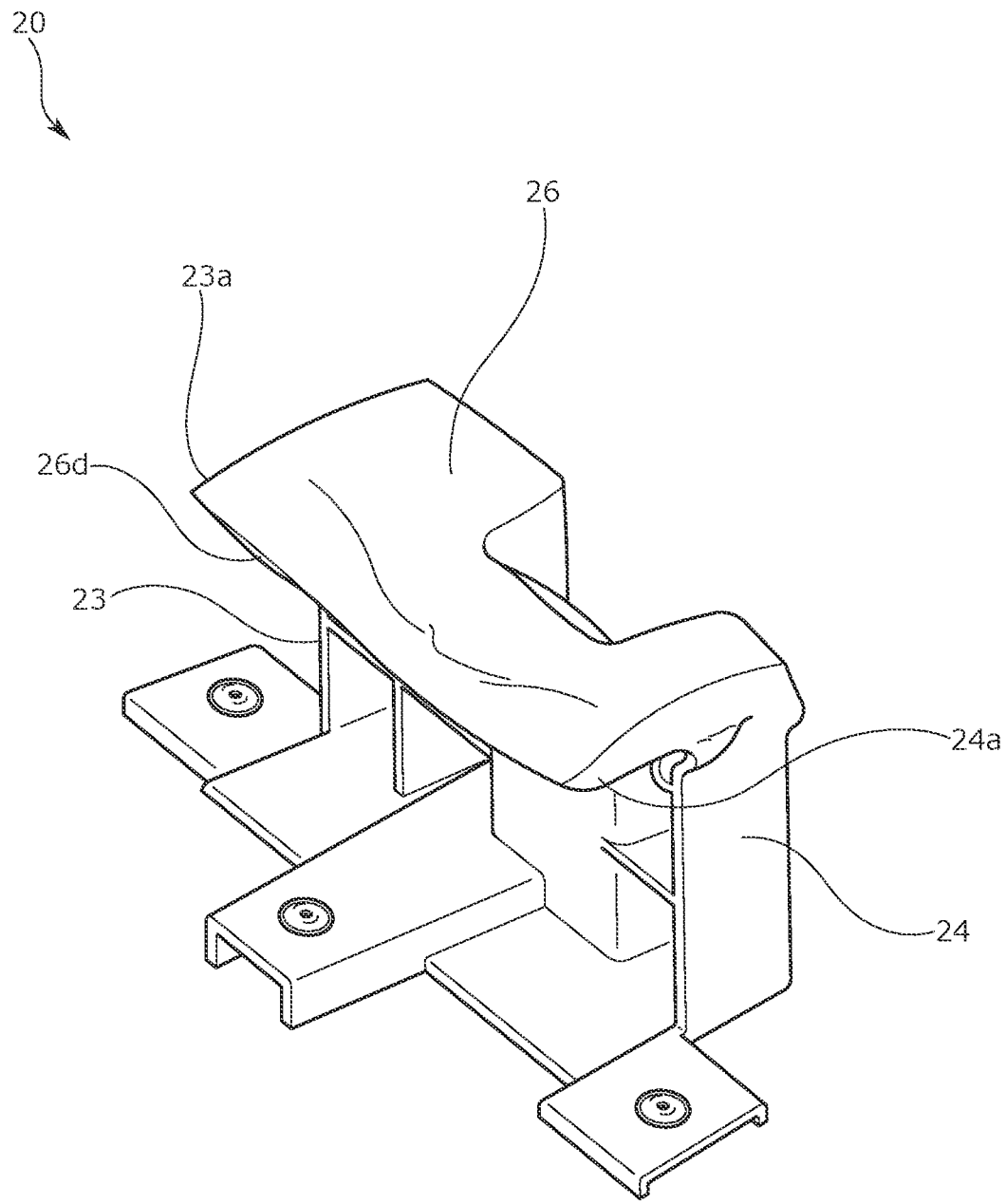
FIG. 16C is a schematic view for describing the process of deformation of the protector in the event of a side collision (part 3).
Figure 16D:
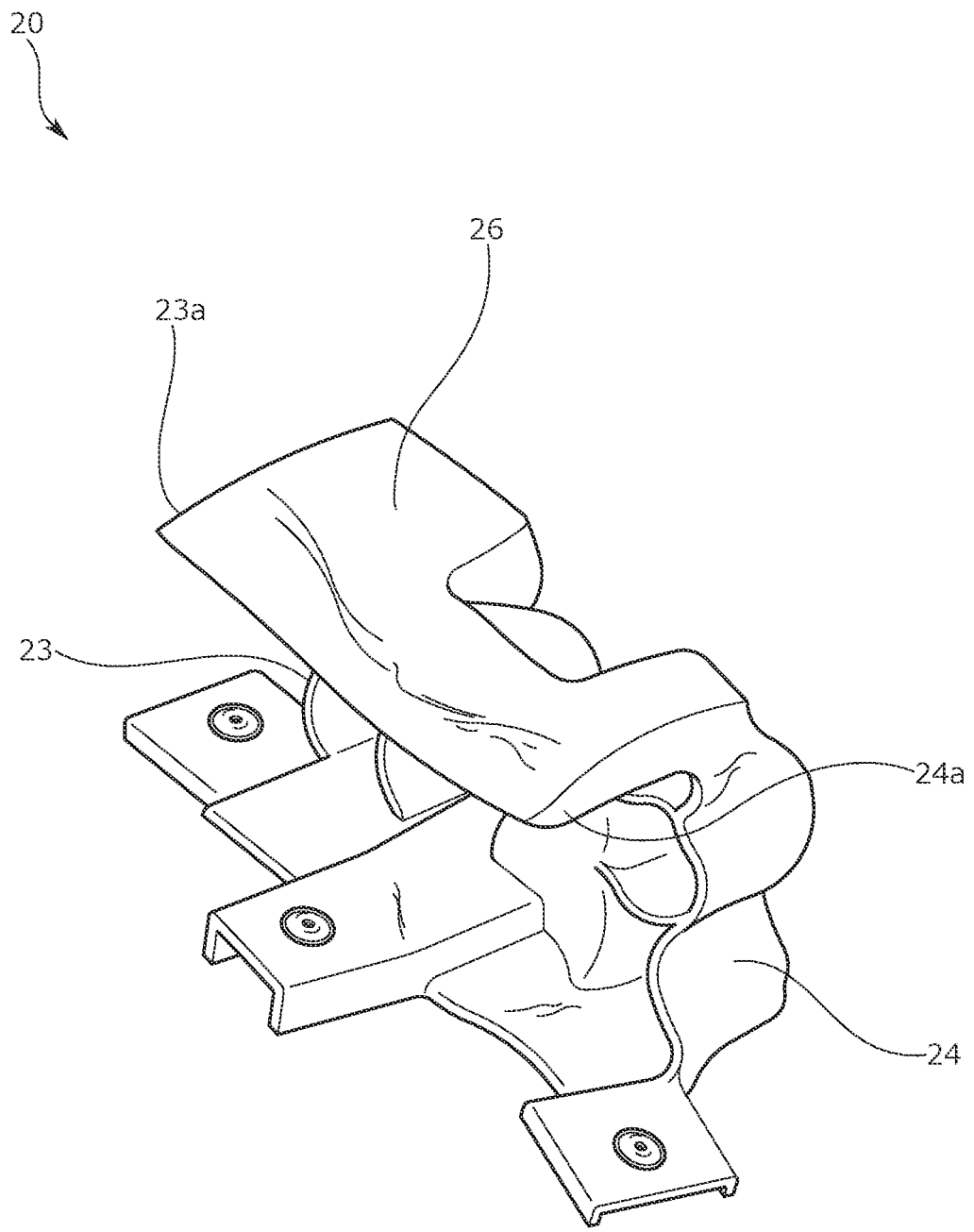
FIG. 16D is a schematic view for describing the process of deformation of the protector in the event of a side collision (part 4).
Figure 16D:
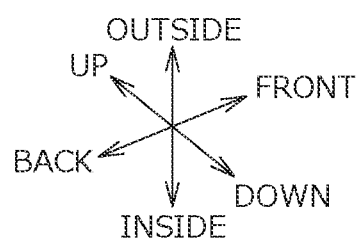
Figure 16E:
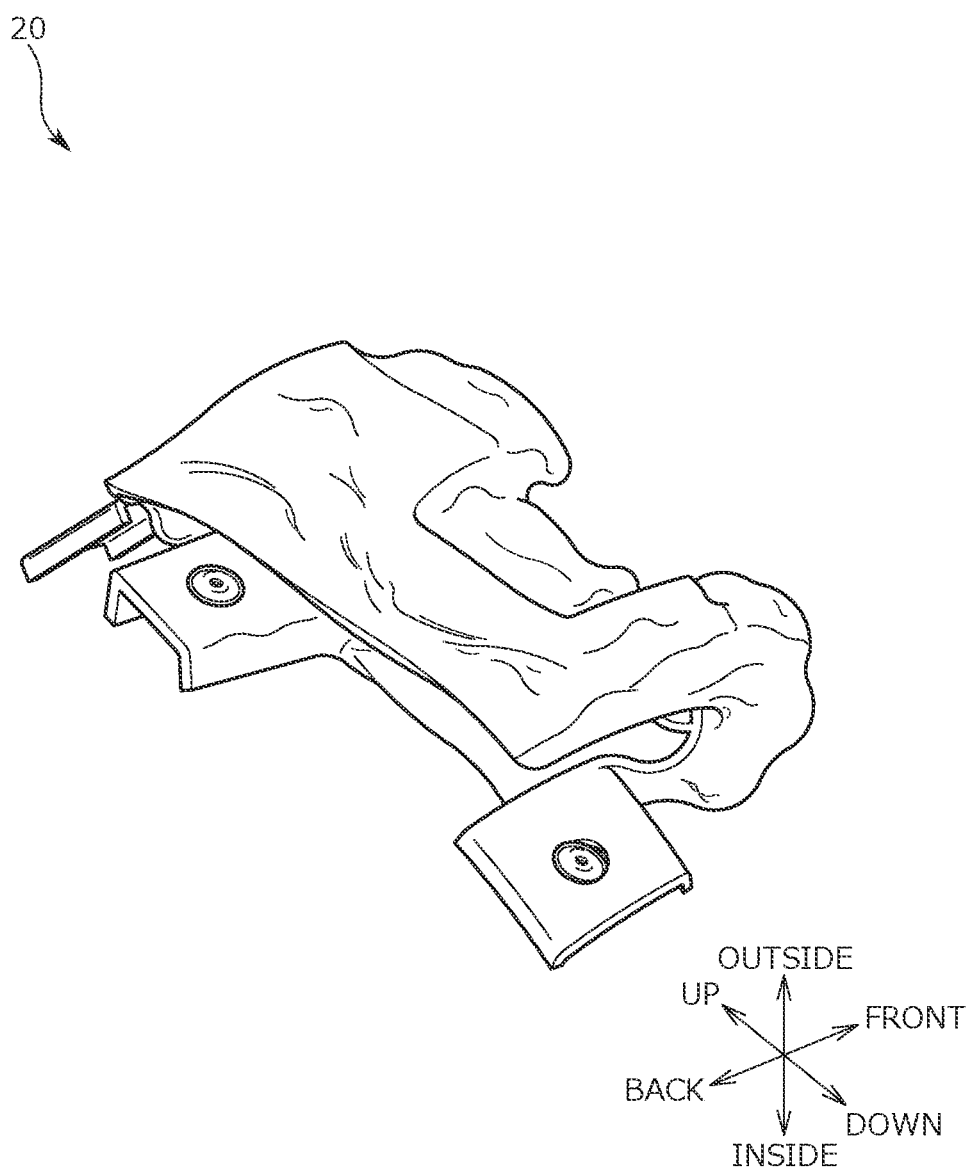
FIG. 16E is a schematic view for describing the process of deformation of the protector in the event of a side collision (part 4).

Specifically, as shown in FIGS. 16A to 16E, when the door panel 1b is deformed and a load is applied to the facing surface 26 in the event of a side collision, first, the free end portion 26d of the facing surface 26 is deformed inward (FIG. 16B). At this time, as the facing surface 26 is displaced inward, the upper surface 23 and the lower surface 24 are curved and crushed from the cutouts 23b and 24b serving as starting points (FIGS. 16C to 16E). More specifically, as the facing surface 26 is displaced inward, the protector 20 is deformed such that the upper surface protrusion portion 23a of the upper surface 23 and the lower surface protrusion portion 24a of the lower surface 24 are directed inward and forward.

In such a manner, in the process of deformation of the protector 20 in the event of a side collision, when the protector 20 is attached to the door trim 1a in a cantilever manner, the initial rise of a load stress applied to the facing surface 26 is moderated, so that energy absorption efficiency is improved.

The upper attachment plate 27, the lower attachment plate 28, and the middle attachment plate 29 each including the fixing portion include the ribs 27b, the ribs 28b, and the ribs 29b, respectively, and are formed to protrude from the bottom surface 25 in the direction toward the facing surface 26. According to such a configuration, since the fixing portions are formed to protrude, rigidity of the fixing portions is improved, and the fixing of the protector 20 to the door trim 1a is stabilized.

When the upper attachment plate 27, the lower attachment plate 28, and the middle attachment plate 29 each including the fixing portion are shaped to protrude from the bottom surface 25, spaces are disposed between a base material of the door trim 1a and fixing seat surfaces of the fixing portions. Since the welded portions 1d are formed by welding in a state where the spaces are provided between the base material surface of the door trim 1a and the fixing seat surfaces of the fixing portions by the ribs 27b, the ribs 28b, and the ribs 29b, the fixing after the welding is stabilized, and the appearance also becomes good.

The upper surface 23 and the lower surface 24 of the protector 20 include the upper surface protrusion portion 23a and the lower surface protrusion portion 24a protruding backward from the rear surface 22, on the facing surface 26 side (namely, the outside), respectively (FIGS. 9 and 10). According to such a configuration, since the protector 20 has an inverted L-shaped structure (inverted L-shape) in a top view and in a bottom view, it is possible to reduce the weight of the protector 20 while appropriately absorbing an impact applied to the protector 20 in the event of a side collision.

Here, the inverted L-shaped structure of the protector 20 in a top view and in a bottom view means that since the upper surface protrusion portion 23a and the lower surface protrusion portion 24a exist on the upper surface 23 and on the lower surface 24, respectively, the cutout 23b and the cutout 24b are formed behind the rear surface 22. In such a manner, when portions to be strengthened and portions to be weakened are considered in view of impact absorption performance against a side collision, the inverted L-shaped structure that is rotated by 90 degrees can be appropriately formed.

The facing surface 26 of the protector 20 is inclined in a direction toward the bottom surface 25 (inside) while extending from the free end portion 26d at the rear end of the facing surface 26 toward the front (FIGS. 9 and 10). In such a manner, since the facing surface 26 that is a contact surface for impact is inclined, the free end portion 26d that is one end portion of the facing surface 26 can be first brought into contact with the door panel 1b. In addition, since the facing surface 26 that comes into contact with the door panel 1b is an inclined surface, the structure of the mold for manufacturing the protector 20 can be simplified.

In addition, since the fixing portions are formed on the bottom surface 25 located inside the free end portion 26d of the facing surface 26 that is a contact surface of the protector 20 attached to the door trim 1a in a cantilever manner, it is possible to absorb an impact by reliably receiving a load.

In a top view of the protector 20, the upper attachment hole 27*a* as a fixing portion and the upper attachment plate 27 are disposed at a position facing the upper surface protrusion portion 23*a*. In addition, in a bottom view of the protector 20, the lower attachment hole 28*a* as a fixing portion and the lower attachment plate 28 are disposed at a position facing the lower surface protrusion portion 24*a* (FIGS. 9 and 10). According to such a configuration, since a C-shaped (substantially U-shaped) cross section is formed by the facing surface 26, the front surface 21, and the bottom surface 25, it is possible to absorb an impact by appropriately receiving a load.

The front surface recessed portion 21*c* (first recessed portion) extending in the width direction is formed in the front surface 21 of the protector 20, and the upper attachment hole 27*a*, the lower attachment hole 28*a*, and the middle attachment hole 29*a* as fixing portions are provided only on a rear side with respect to the bottom portion 21*d* of the front surface recessed portion 21*c* in the front to back direction (FIGS. 12 to 15). According to such a configuration, since the fixing portions are disposed opposite the front surface recessed portion 21*c*, and the fixing range of the protector 20 is widened, a load can be stably received. In addition, since the fixing portions are disposed at positions avoiding the rear surface 22 and the bottom portion 21*d* of the front surface recessed portion 21*c* (first recessed portion), namely, upright walls, it is possible to efficiently improve rigidity of the fixing portions while suppressing an increase in the weight of the protector 20.

A portion of the front surface recessed portion 21*c* (first recessed portion) of the front surface 21 of the protector 20 is disposed in the same height position as that of the bottom surface recessed portion 25*c* (second recessed portion) of the bottom surface 25 in the up to down direction (FIGS. 6, 7, 11, and 15). According to such a configuration, since the front surface recessed portion 21*c* and the bottom surface recessed portion 25*c* at least partially intersect each other, rigidity of a connecting portion between the front surface 21 or the rear surface 22 and the bottom surface 25 that is a fixing surface to the door trim 1*a* is improved. In addition, since the front surface recessed portion 21*c* and the bottom surface recessed portion 25*c* are at least partially offset and intersect each other in the up to down direction, the rigidity of the connecting portion between the bottom surface 25 and the front surface 21 or the rear surface 22 is further improved.

Modification Example

Figure 17:
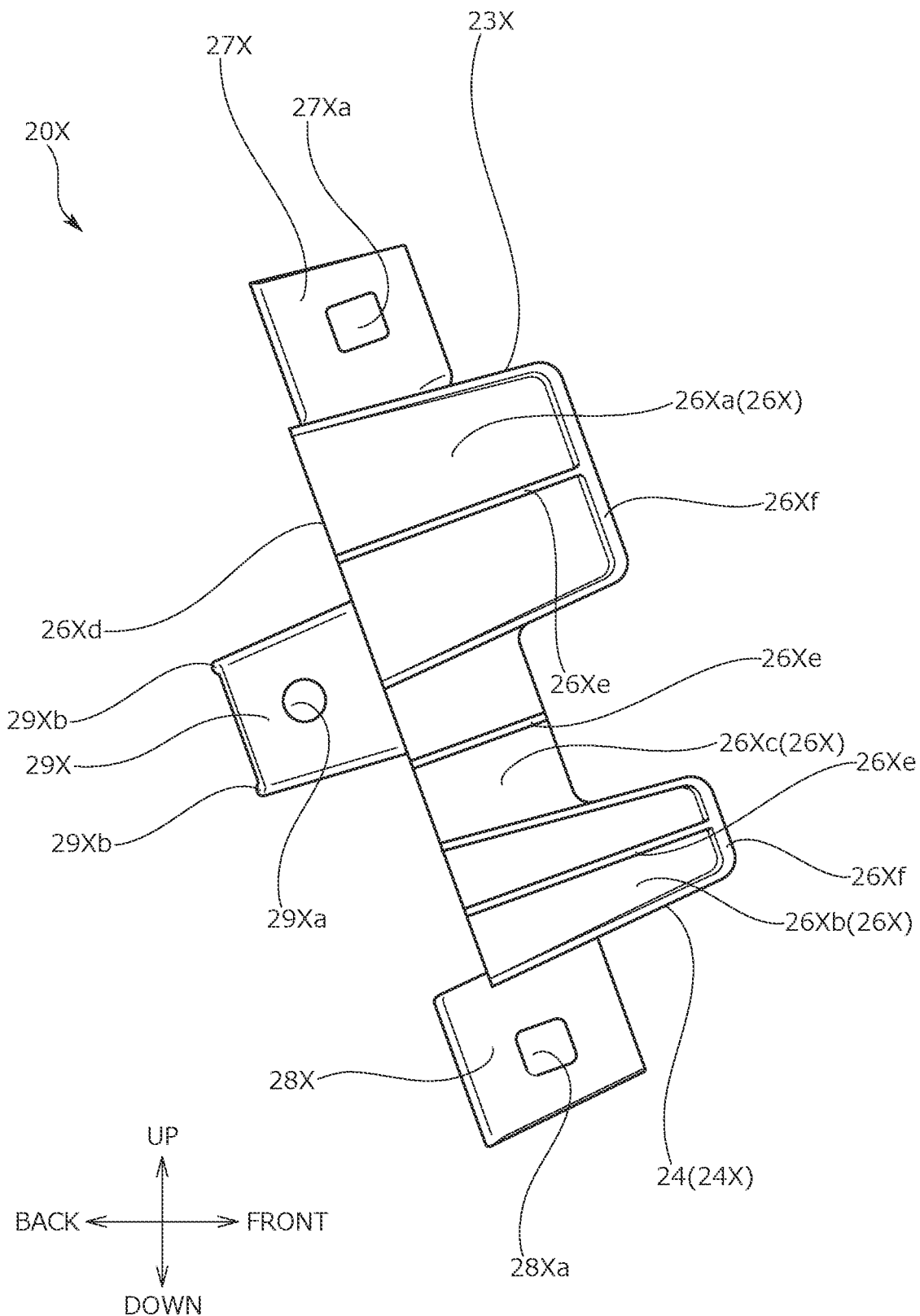
FIG. 17 is a view of a protector according to a modification example when viewed from the outside.
Figure 18:
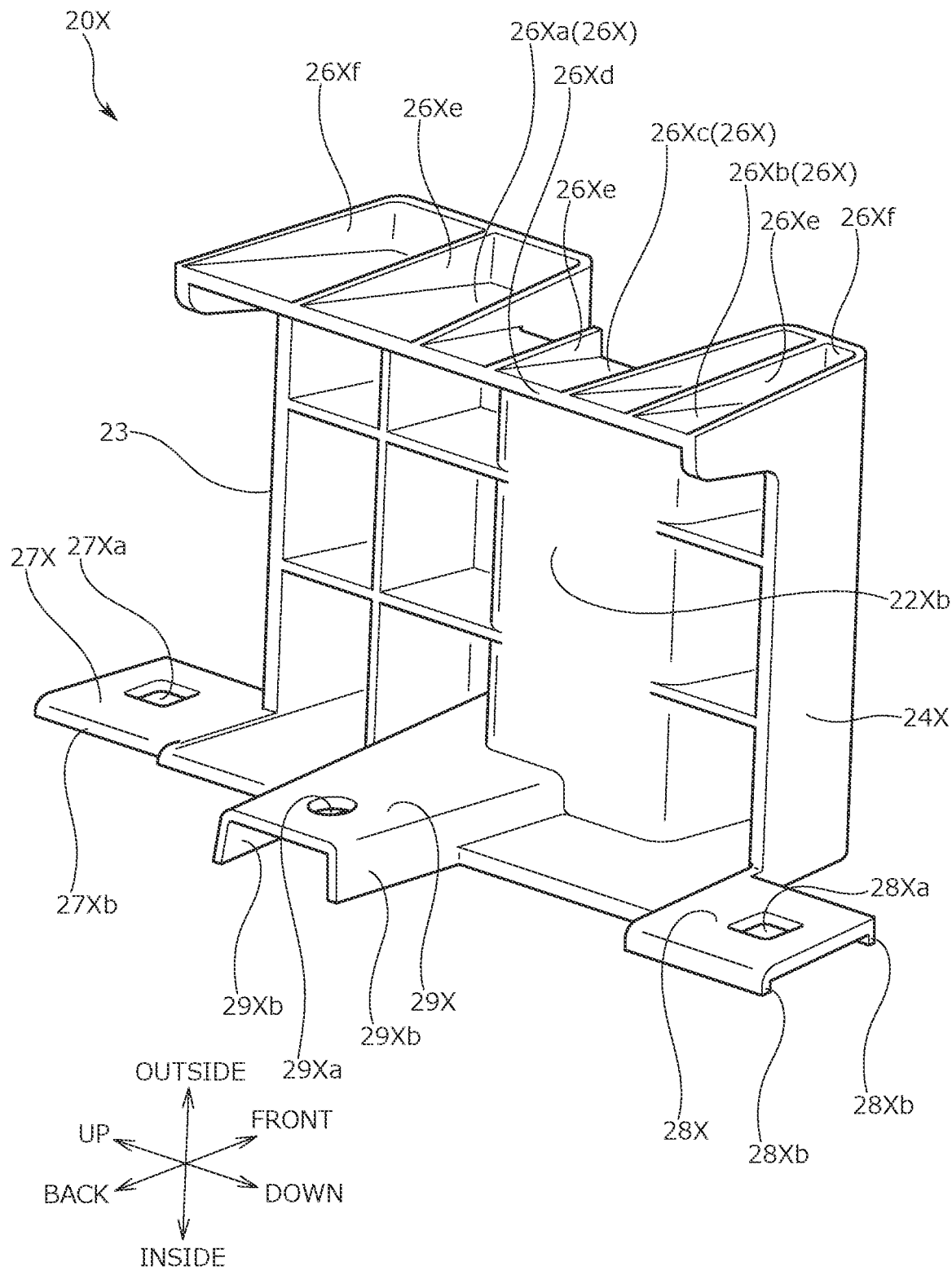
FIG. 18 is a perspective view of the protector according to the modification example when viewed from the lower rear side.

Next, a protector 20X as an impact absorbing member according to a modification example will be described with reference to FIGS. 17 to 19. Incidentally, the following description of the modification example, the same components as those of the embodiment are given the same names and reference signs (numerals), the description thereof will not be repeated, and differences will be mainly described.

The protector 20X includes reinforcement ribs 26Xe and 26Xf on a facing surface 26X. Specifically, one reinforcement rib 26Xe is upright provided on each of a facing surface upper portion 26Xa, a facing surface lower portion 26Xb, and a facing surface middle portion 26Xc. In addition, the reinforcement ribs 26Xf are formed on respective peripheral edge portions of the facing surface upper portion 26Xa and the facing surface middle portion 26Xc so as to surround the facing surface upper portion 26Xa and the facing surface middle portion 26Xc in the up to down direction and in the front.

It is preferable that each of the reinforcement ribs 26Xe and 26Xf is inclined toward the inside while extending from the front toward the rear. In such a manner, since the reinforcement ribs 26Xe and 26Xf are formed on the facing surface 26X, an impact can be suitably received.

In addition, in the embodiment, the protector 20 has been described as being attached to the door trim 1*a* and being attached at a position facing the door panel 1*b*, but the attachment relationship may be reversed. Namely, an object to which the protector 20 is attached may be one of the door trim 1*a* and the door panel 1*b* as long as an impact can be suitably absorbed thereby.

In addition, in the embodiment, the side door component 1 disposed on a right side of the vehicle has been described as an example, but a mode in which the side door component is disposed on a left side of the vehicle can also be implemented. Further, the disposition of each fixing portion of the protector 20 is not limited to the embodiment, and a positional relationship of the front to back direction can also be reversed.

Incidentally, in the embodiment, the interior component for a vehicle has been described as an example, but the present invention is not limited to being applied to the vehicle, and the technical concept of the present invention can be applied to an interior component for a conveyance such as an aircraft, a ship, or an industrial machine.

REFERENCE SIGNS LIST

1: side door component (interior component for vehicle)
  1*a*: door trim
    1*aa*: base material resin layer
    1*ab*: skin resin layer
  1*b*: door panel
  1*c*: door pocket (another member)
  1*d*: welded portion
  1*e*: door pocket fixing portion
20, 20X: protector (impact absorbing member)
21, 21X: front surface
  21*a*, 21Xa: front surface upper portion
  21*b*, 21Xb: front surface lower portion
  21*c*, 21Xc: front surface recessed portion (first recessed portion)
  21*d*, 21Xd: bottom portion
22, 22X: rear surface
  22*a*, 22Xa: rear surface upper portion
  22*d*1: reinforcement rib
  22*d*2: reinforcement rib
  22*b*, 22Xb: rear surface lower portion
  22*d*3: reinforcement rib
  22*c*, 22Xc: rear surface middle portion
23, 23X: upper surface
  23*a*: upper surface protrusion portion
  23*b*: cutout
24, 24X: lower surface
  24*a*: lower surface protrusion portion
  24*b*: cutout
25, 25X: bottom surface
  25*a*, 25Xa: bottom surface upper portion
  25*b*, 25Xb: bottom surface lower portion
  25*c*, 25Xc: bottom surface recessed portion (second recessed portion)
26, 26X: facing surface
  26*a*, 26Xa: facing surface upper portion
  26*b*, 26Xb: facing surface lower portion
  26*c*, 26Xc: facing surface middle portion
  26*d*, 26Xd: free end portion 26Xe: reinforcement rib
26Xf: reinforcement rib
27, 27X: upper attachment plate
   27a, 27Xa: upper attachment hole (fixing portion)
   27b, 27Xb: rib
28, 28X: lower attachment plate
   28a, 28Xa: lower attachment hole (fixing portion)
   28b, 28Xb: rib
29: middle attachment plate
   29a, 29Xa: middle attachment hole (fixing portion)
   29b, 29Xb: rib

The invention claimed is:

1. An interior component for a vehicle, comprising:
a door panel;
a door trim attached to the door panel;
an impact absorbing member disposed between the door panel and the door trim and attached to one of the door panel and the door trim;
another member attached to the one of the door panel and the door trim; and
another member fixing portion that attaches the another member to the one of the door panel and the door trim;
wherein:
the impact absorbing member has a bottom surface on which a fixing portion attached to the one of the door panel and the door trim is formed, and a facing surface facing the other of the door panel and the door trim,
the impact absorbing member has a front surface disposed in a front, a rear surface disposed in a rear, an upper surface disposed on an upper side, and a lower surface disposed on a lower side, between the facing surface and the bottom surface,
each of the upper surface and the lower surface of the impact absorbing member includes a protrusion portion protruding backward or forward from the rear surface on a facing surface side of each of the upper surface and the lower surface,
a first recessed portion extending in a vehicle width direction is formed in the front surface or the rear surface of the impact absorbing member, and
the another member fixing portion is disposed at a position facing the first recessed portion of the impact absorbing member.

2. The interior component for a vehicle according to claim 1,
wherein the bottom surface of the impact absorbing member includes a second recessed portion recessed in a direction toward the facing surface, and
a portion of the first recessed portion is disposed at a same height position as a height position of the second recessed portion in a vehicle up to down direction.

3. The interior component for a vehicle according to claim 1,
wherein the another member fixing portion is disposed at a position surrounded by the first recessed portion.

4. The interior component for a vehicle according to claim 1,
wherein the fixing portion is provided only on one of a front side and a rear side with respect to a bottom portion of the first recessed portion in a vehicle front to back direction.

5. The interior component for a vehicle according to claim 4,
wherein a plurality of reinforcement ribs are provided on the rear surface of the impact absorbing member, and the bottom portion of the first recessed portion is correspondingly disposed between the plurality of reinforcement ribs.

6. The interior component for a vehicle according to claim 4,
wherein the fixing portion is provided behind the rear surface and behind the bottom portion of the first recessed portion in the vehicle front to back direction.

7. The interior component for a vehicle according to claim 1,
wherein the facing surface of the impact absorbing member is inclined in a direction toward the bottom surface while extending toward the front or the rear.

8. The interior component for a vehicle according to claim 7,
wherein the fixing portion of the impact absorbing member is formed to protrude in a direction from the bottom surface toward the facing surface.

9. The interior component for a vehicle according to claim 7,
wherein the facing surface, the front surface, and the bottom surface form a C-shaped cross section.

10. The interior component for a vehicle according to claim 7,
wherein the fixing portion is provided only on one of a front side and a rear side with respect to a bottom portion of the first recessed portion in a vehicle front to back direction.

11. The interior component for a vehicle according to claim 1,
wherein the fixing portion of the impact absorbing member is formed to protrude in a direction from the bottom surface toward the facing surface.

12. The interior component for a vehicle according to claim 11,
wherein the facing surface, the front surface, and the bottom surface form a C-shaped cross section.

13. The interior component for a vehicle according to claim 11,
wherein the fixing portion is provided only on one of a front side and a rear side with respect to a bottom portion of the first recessed portion in a vehicle front to back direction.

14. The interior component for a vehicle according to claim 1,
wherein the facing surface, the front surface, and the bottom surface form a C-shaped cross section.

15. The interior component for a vehicle according to claim 14,
wherein the fixing portion is provided only on one of a front side and a rear side with respect to a bottom portion of the first recessed portion in a vehicle front to back direction.

16. A method for manufacturing an interior component for a vehicle, comprising:
preparing a door panel and a door trim attached to the door panel;
preparing an impact absorbing member, wherein the impact absorbing member comprises a bottom surface on which a fixing portion configured to be attached to the one of the door panel and the door trim is formed, a facing surface facing the other of the door panel and the door trim, a front surface disposed in a front, a rear surface disposed in a rear, an upper surface disposed on an upper side, and a lower surface disposed on a lower side, wherein the front surface, the rear surface, the upper surface and the lower surface are located between the facing surface and the bottom surface, and wherein a first recessed portion extending in a vehicle width direction is formed in the front surface or the rear surface of the impact absorbing member;

preparing another member configured to be attached to the one of the door panel and the door trim, wherein the another member includes another member fixing portion for attaching the another member to the one of the door panel and the door trim;

disposing the impact absorbing member between the door panel and the door trim and attaching the impact absorbing member to one of the door panel and the door trim via the fixing portion; and disposing the another member fixing portion at a position facing the first recessed portion of the impact absorbing member and attaching the another member to one of the door panel and the door trim via the another member fixing portion, wherein each of the upper surface and the lower surface of the impact absorbing member includes a protrusion portion protruding backward or forward from the rear surface on a facing surface side of the each of the upper surface and the lower surface.

* * * * *